US012706074B2

(12) United States Patent
Lyles

(10) Patent No.: US 12,706,074 B2
(45) Date of Patent: Aug. 11, 2026

(54) STRING TENSIONER FOR STRINGED INSTRUMENT

(71) Applicant: Cosmos Lyles, New York, NY (US)

(72) Inventor: Cosmos Lyles, New York, NY (US)

(*) Notice: Subject to any disclaimer, the term of this patent is extended or adjusted under 35 U.S.C. 154(b) by 310 days.

(21) Appl. No.: 18/623,337

(22) Filed: Apr. 1, 2024

(65) Prior Publication Data

US 2024/0331663 A1 Oct. 3, 2024

Related U.S. Application Data

(60) Provisional application No. 63/455,664, filed on Mar. 30, 2023.

(51) Int. Cl.
*G10D 3/12* (2020.01)
*G10D 1/08* (2006.01)

(52) U.S. Cl.
CPC ................. *G10D 3/12* (2013.01); *G10D 1/08* (2013.01)

(58) Field of Classification Search
CPC ................................... G10D 3/12; G10D 1/08
USPC ................................................ 84/297 R, 299
See application file for complete search history.

(56) References Cited

U.S. PATENT DOCUMENTS

| | | | |
|---|---|---|---|
| 16,995 | A | 4/1857 | Randle |
| 1,416,568 | A | 5/1922 | Mazzocco |
| 1,626,753 | A | 5/1927 | Carlson et al. |
| 1,684,057 | A | 9/1928 | Fisher |
| 2,070,916 | A | 2/1937 | Peate |
| 2,130,248 | A | 9/1938 | Peate |
| 2,262,179 | A | 11/1941 | Hammond |
| 2,298,611 | A | 10/1942 | Bruderlin |
| 2,453,572 | A | 11/1948 | Ferrier |
| 2,514,835 | A | 7/1950 | Bredice |
| 2,605,061 | A | 7/1952 | Howe |
| 2,873,640 | A | 2/1959 | Kunz |
| 3,437,001 | A | 4/1969 | Kraft |
| 3,580,525 | A | 5/1971 | Dopner |
| 3,667,336 | A | 6/1972 | Itzler et al. |
| 4,909,126 | A | 3/1990 | Skinn |
| 5,018,700 | A | 5/1991 | Hardtke |
| 5,040,741 | A | 8/1991 | Brown |
| 5,095,797 | A | 3/1992 | Zacaroli |
| 5,284,396 | A | 2/1994 | Masumura et al. |

(Continued)

FOREIGN PATENT DOCUMENTS

| | | | |
|---|---|---|---|
| WO | WO 2006-023600 | A2 | 3/2006 |
| WO | WO 2007-106600 | A2 | 9/2007 |

*Primary Examiner* — Laura K Tso
(74) *Attorney, Agent, or Firm* — FisherBroyles, LLC; Glen L Nuttall

(57) ABSTRACT

A string tensioner for a stringed musical instrument is configured to apply a constant or near-constant tension to a musical string of the instrument. The string tensioner employs a primary spring that applies a primary force coaxial with the string. Each string tensioner also employs one or more secondary springs that apply a secondary force in a direction crossing the axis of the string. The secondary force has an axial force component that changes as the angle of the secondary spring changes. The primary and secondary springs are selected so that as the string changes in length over time the change in the secondary force axial component approximates the change in force applied by the primary spring so that the axial force applied to the string remains generally constant.

19 Claims, 17 Drawing Sheets

(56) References Cited

U.S. PATENT DOCUMENTS

| | | | | |
|---|---|---|---|---|
| 5,323,680 | A | 6/1994 | Miller et al. | |
| 5,377,926 | A | 1/1995 | Min | |
| 5,390,579 | A | 2/1995 | Burgon | |
| 5,477,765 | A | 12/1995 | Dietzman | |
| 7,479,592 | B1 | 1/2009 | Slavik | |
| 7,534,950 | B2 | 5/2009 | Lyles | |
| 7,554,023 | B2 | 6/2009 | Tyler | |
| 7,592,528 | B2 | 9/2009 | Lyles et al. | |
| 7,692,079 | B2 | 4/2010 | Lyles | |
| 7,855,330 | B2 | 12/2010 | Lyles et al. | |
| 7,888,570 | B2 | 2/2011 | Lyles et al. | |
| 8,152,126 | B2 | 4/2012 | Hardtke | |
| 8,440,897 | B1 | 5/2013 | Baxter | |
| 8,779,258 | B2 | 7/2014 | Lyles et al. | |
| 8,857,110 | B2 | 10/2014 | Constantinou et al. | |
| 9,318,081 | B2 | 4/2016 | Lyles | |
| 9,495,941 | B2 | 11/2016 | Stanley | |
| 9,613,600 | B2 | 4/2017 | Lyles | |
| 9,792,886 | B2 | 10/2017 | Lyles | |
| 10,224,009 | B2 | 3/2019 | Lyles | |
| 10,229,659 | B2 | 3/2019 | Lyles | |
| 11,335,305 | B2 | 5/2022 | Lyles | |
| 2007/0289429 | A1 | 12/2007 | Tyler | |
| 2016/0104465 | A1 | 4/2016 | Lyles | |
| 2019/0362695 | A1* | 11/2019 | Glaser, II | G10D 3/04 |
| 2025/0316249 | A1* | 10/2025 | Lyles | G10D 3/04 |

* cited by examiner

STRING TENSIONER FOR STRINGED INSTRUMENT

CROSS-REFERENCE TO RELATED APPLICATIONS

This application claims priority to U.S. Provisional Application No. 63/455,664, which was filed Mar. 30, 2023, the entirety of which is hereby incorporated by reference.

This application also relates to some of the subject matter concerning methods and apparatus for holding wires or strings as disclosed in Applicant's U.S. Pat. No. 7,855,330, which issued Dec. 21, 2010, U.S. Pat. No. 9,318,081, which issued Apr. 19, 2016, and U.S. Pat. No. 10,224,009, which issued Mar. 5, 2019. The entirety of each of these related applications is hereby incorporated by reference.

BACKGROUND

The present disclosure relates to the field of stringed musical instruments, and more particularly to string tensioners for stringed musical instruments.

Various products and applications benefit from holding a wire or string at a near-constant, predictable tension over time and in a variety of environmental conditions. Notably, stringed musical instruments create music by vibrating strings held at tension. If the string is at the correct tension for the given instrument, it will vibrate at a desired frequency corresponding to the desired note. However, musical strings tend to stretch or contract over time and/or due to environmental factors such as temperature, humidity or the like. Such stretching or contracting typically results in the tension in the string changing, and the string thus vibrating at a different frequency than the desired frequency. This can result in the string going out of tune-emitting a note that is aurally different than the desired note. Typical stringed musical instruments tend to go out of tune fairly quickly, and musicians often find themselves spending substantial time tuning their instruments, even in the midst of performances.

The appearance of a musician's instrument is often seen as an expression of the artist, and thus musicians tend to desire that their instrument's componentry be non-obtrusive so as not to dominate the appearance. Also, certain instruments, particularly acoustic instruments, can be sensitive to componentry, particularly metal componentry, placed in certain portions of the instrument. Further, componentry should avoid possibly interfering with a musician during play.

SUMMARY

The present specification discloses method and apparatus for mounting a string of a stringed musical instrument in a manner so that the string remains at a near-constant tension even if the string stretches or contracts over time and/or due to environmental factors. The specification also teaches such a method and apparatus that has a relatively small footprint and can be installed in certain stringed instruments without substantially altering the sound of the instrument, altering its appearance, or interfering with playability.

The present specification describes an embodiment in which a carrier to which a musical string can be attached is longitudinally movable relative to a base along a longitudinal axis. The carrier can be constrained to move only axially relative to the base. A primary spring operates between the carrier and base and exerts an axial force. A secondary spring is attached between an end of the base and a corresponding end of the carrier, and exerts a force transverse to the axis. When the carrier moves axially relative to the base, the direction of the secondary spring force changes, and thus an axial component of such secondary spring force also changes. The primary spring and secondary springs are chosen so that the axial component of the secondary spring force generally tracks the change in axial force exerted by the primary spring so that a net axial force exerted on the string remains generally constant as the carrier moves longitudinally relative to the base. In some embodiments another secondary spring can be attached between an opposite end of the base and a corresponding opposite end of the carrier. Also, the secondary springs can comprise flat sheet springs. Further, one or more bearings can be arranged between the carrier and base.

In accordance with one embodiment the present specification provides a string tensioner for a stringed musical instrument comprising an elongated base extending from a base proximal end to a base distal end. The base comprises a base primary spring mount. An elongated carrier extends from a carrier proximal end to a carrier distal end. The carrier comprises a string holder and a carrier primary spring mount. A primary spring extends from the base primary spring mount to the carrier primary spring mount. The primary spring is configured to exert a primary spring tension in an axial direction along a longitudinal axis of the string tensioner. A distal secondary spring extends from the base distal end to the carrier distal end. The secondary spring is configured to apply a distal secondary spring force in a direction transverse to the longitudinal axis.

In some embodiments the carrier is constrained to move only in the axial direction relative to the base. In additional embodiments the distal secondary spring comprises a spring sheet that is compressed along a spring sheet axis normal to the longitudinal axis of the string tensioner. In some such embodiments the distal secondary spring comprises a plurality of spring sheets sandwiched between spacers at opposing mount ends of the distal secondary spring.

In further embodiments the distal secondary spring comprises opposing first and second mount ends and spaced apart mount holes at each of the opposing first and second mount ends, the base distal end comprises a pair of space apart receiver holes, and the carrier distal end comprises a pair of spaced apart receiver holes, and wherein a fastener extends through each of the mount holes and receiver holes to attach the distal secondary spring to the base and carrier.

Yet further embodiments additionally comprise a proximal secondary spring extending from the base proximal end to the carrier proximal end, the proximal secondary spring is configured to apply a proximal secondary spring force in a direction transverse to the longitudinal axis, wherein the proximal secondary spring comprises a flat sheet spring.

In yet further embodiments a carrier body is spaced from a base body. The base has a base support arm defining a base support arm track and the carrier has a carrier support arm defining a carrier support arm track. The base support arm track is closer to the carrier body than is the carrier support arm track. A bearing is disposed between the base support arm and the carrier support arm so as to simultaneously engage the base support arm track and the carrier support arm track. In some such embodiments the distal secondary spring urges the carrier away from the base in a direction transverse to the axis, and when the bearing is simultaneously engaged with the base support arm track and the carrier support arm track the carrier is blocked by the bearing from moving away from the base in the direction transverse to the axis.

In yet further embodiments the carrier comprises a first stop and the base comprises a second stop, the first and second stops configured to block distal movement of the carrier relative to the base beyond a stop location, and wherein the first stop has a first stop surface that is arcuate about a first axis of rotation transverse to the longitudinal axis, and the second stop has a second stop surface that is arcuate about a second axis of rotation transverse to the longitudinal axis and transverse to the first axis of rotation.

In yet additional embodiments the carrier comprises a first stop and the base comprises a second stop, the first and second stops configured to block distal movement of the carrier relative to the base beyond a stop location, and wherein the first stop is formed of a material different than the second stop.

In accordance with another embodiment, the present specification provides a constant tension device, comprising a carrier configured to be movable along an axis over a base. A wire or string is attached to the carrier so that an axial force applied to the carrier is communicated to the wire or string. A primary spring has a first end attached to the carrier and a second end attached to the base so that the spring applies a primary spring force to the carrier along the axis. A secondary spring also acts between the carrier and base and applies a secondary spring force transverse to the axis. The secondary spring force has an axially-directed component, and the axial force is a combination of the primary spring force and the axially-directed component of the secondary spring force. The carrier can move relative to the base along the axis, but is constrained from moving in other directions. The primary spring and secondary spring are selected so that as the primary spring force changes as the carrier moves along the axis the axially-directed component of the secondary spring force changes about the same magnitude so that the axial force remains generally constant over an operational range of the constant tension device.

In accordance with yet another embodiment, the present specification provides a string tensioner for a stringed musical instrument, comprising an elongated base extending from a base proximal end to a base distal end, and an elongated carrier extending from a carrier proximal end to a carrier distal end. The base comprises a base primary spring mount. The carrier comprises a string holder and a carrier primary spring mount. The base and carrier are configured so that the carrier can move longitudinally relative to the base along a longitudinal axis. A primary spring assembly extends from the base primary spring mount to the carrier primary spring mount. The primary spring is configured to exert a primary spring tension in an axial direction along the longitudinal axis. A secondary spring assembly extends between the base and the carrier and is configured to apply a secondary spring force between the base and the carrier in a manner so that an axially-directed portion of the secondary spring force varies as the carrier moves longitudinally relative to the base.

Another embodiment additionally comprises a string attached to the string holder so that the tensioner applies a tension to the string, wherein the primary spring assembly and the secondary spring assembly are configured so that when the carrier moves longitudinally a first distance relative to the base, the primary spring tension changes a first primary magnitude and the axially-direction portion of the secondary spring force changes a first secondary magnitude. The change in the tension applied to the string is less than the first primary magnitude.

In some embodiments a normally-directed portion of the secondary spring force urges the carrier away from the base, and a constrainment structure constrains the carrier from moving normally away from the base beyond an operational spacing. In some such embodiments, the constrainment structure comprises one or more bearings placed between the carrier and the base.

In additional embodiments the secondary spring assembly comprises a first secondary spring subassembly positioned proximal of the base primary spring mount and a second secondary spring subassembly longitudinally spaced from the first secondary spring subassembly. In some such embodiments, the first secondary spring subassembly comprises a plurality of spring sheets. In further such embodiments when the first secondary spring subassembly is compressed, a first one of the plurality of spring sheets is deflected to a first magnitude and a second one of the plurality of spring sheets is deflected to a second magnitude that is different than the first magnitude.

DESCRIPTION

The following description presents embodiments illustrating inventive aspects that are employed in a plurality of embodiments. It is to be understood that embodiments may exist that are not explicitly discussed herein, but which may employ one or more of the principles described herein. Also, these principles are primarily discussed in the context of stringed musical instruments. However, it is to be understood that the principles described herein can have other applications such as sporting goods, industrial and/or architectural applications in which it may be desired to apply a near-constant force to an item that may move over an operational range.

This disclosure describes embodiments of a device that can apply a near-constant tension to a string, wire or the like even as that string, wire or the like changes in length over a range of distance. Notably, Applicant's U.S. Pat. No. 7,855,440, which is incorporated herein by reference in its entirety, teaches similar but distinct principles for achieving a near-constant tension in a wire or string as the wire or string expands and/or contracts.

Figure 14:
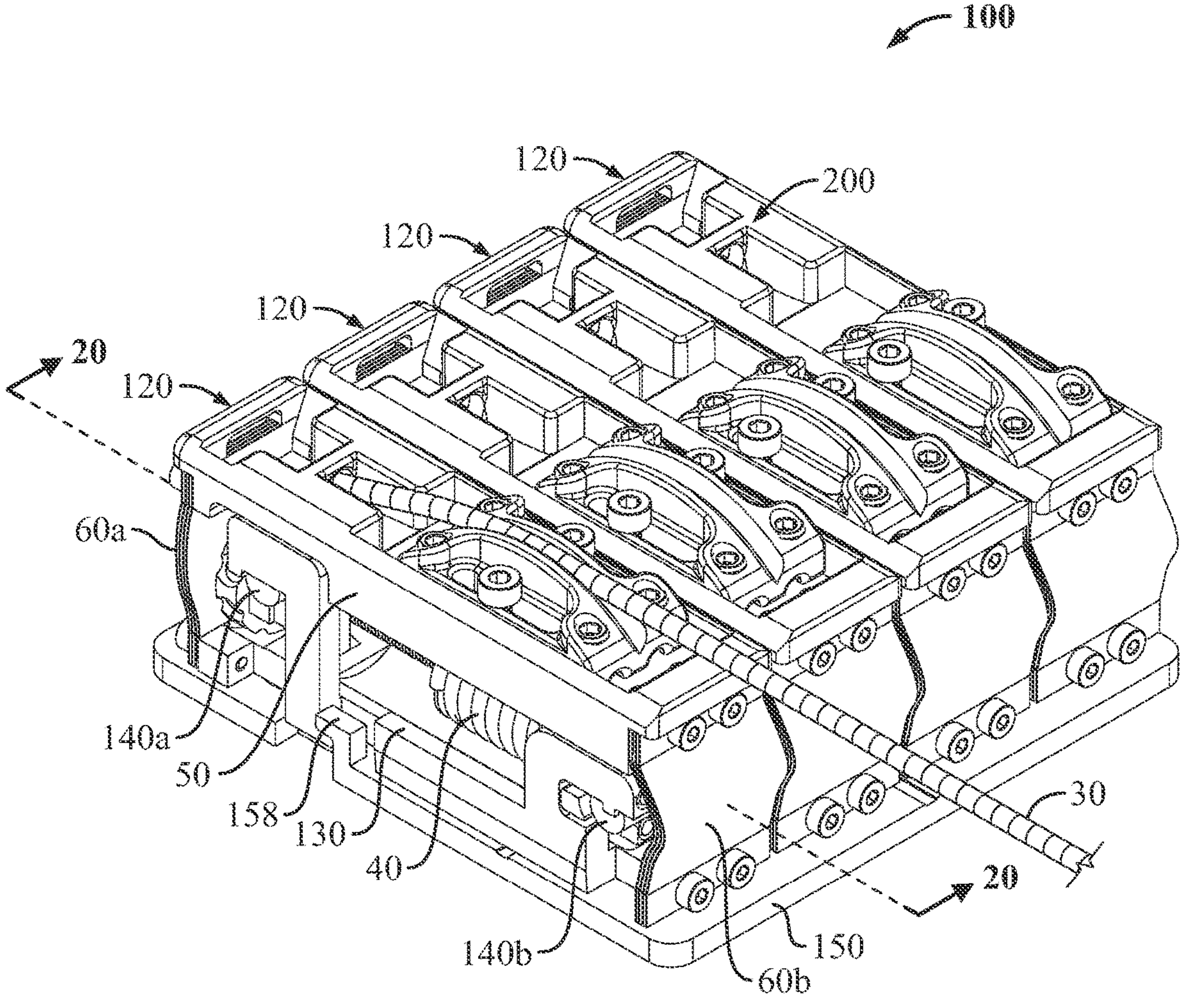
FIG. 14 is a perspective view of a modular string holder assembly configured in accordance with still another embodiment.
Figure 20:
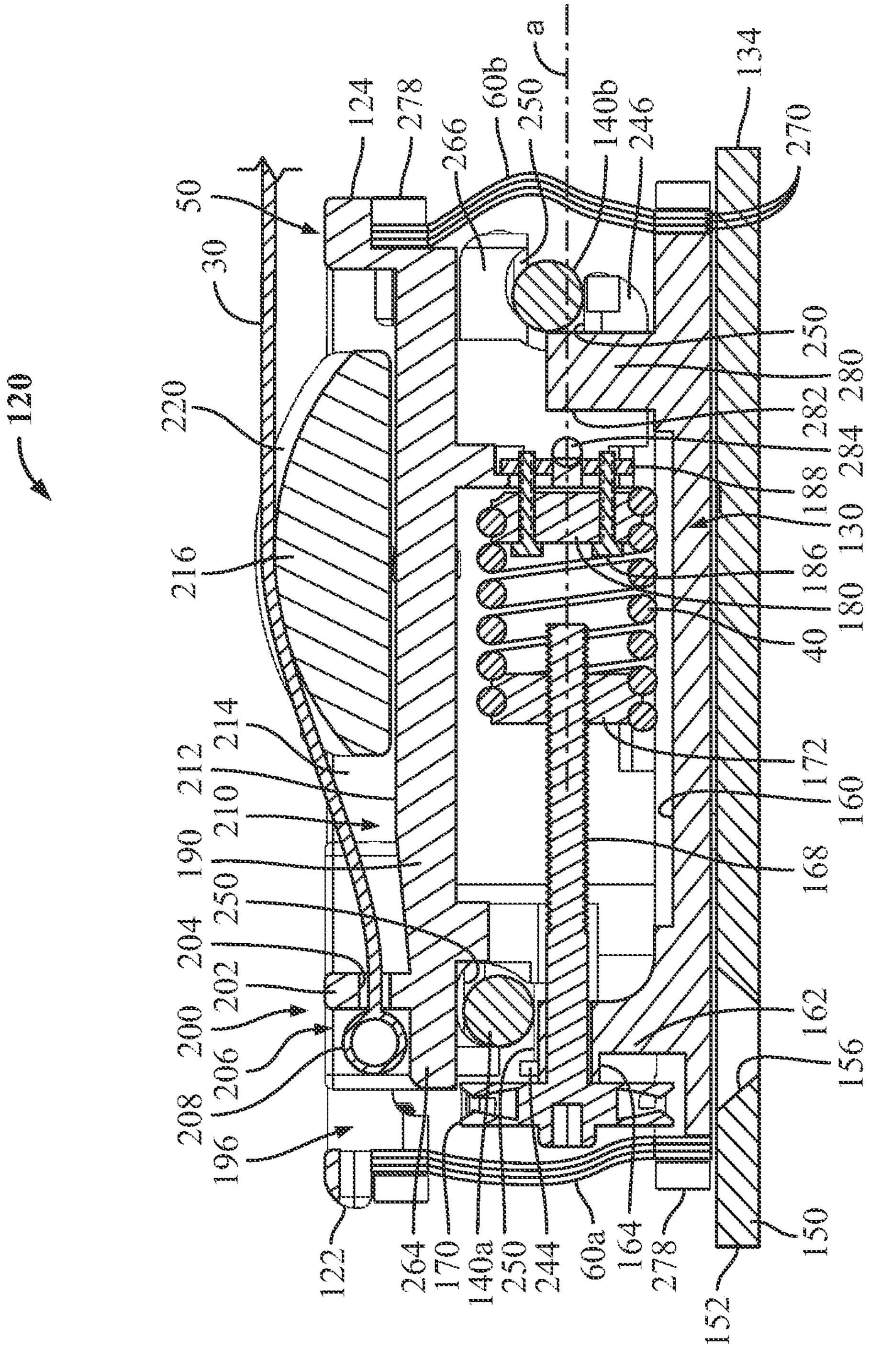
FIG. 20 is a cross-sectional view taken along line 20-20 of FIG. 14.

In this disclosure, and as depicted particularly in FIGS. 14 and 20, a tensioner 120 is made up of a carriage 50 that is moveable longitudinally over a base 130. A primary spring 40 exerts an axially-directed primary spring force Fp between the carriage 50 and base 130. A string mount 200 on the carriage 50 holds a musical string 30 under tension Tw. At least one secondary spring 60*a*, 60*b* is attached between the carrier 50 and base 130 and exerts a secondary spring force Fs transverse to the longitudinal axis a of the tensioner 120. The secondary spring force Fs may have an axially-directed component Fsa that is combined with the primary spring force to supply the string tension Tw. When the carrier 50 moves longitudinally over the base 130 (due to expansion or contraction of the string 30), the direction of the secondary spring force Fs changes, as does the axial component Fsa of that force. The primary spring 40 and secondary springs 60*a*, 60*b* are chosen so that the change in the secondary spring force axial component Fsa generally tracks the change in the primary spring force Fp so that the tension Tw exerted on the string 30 by combining Fp and Fsa remains generally constant even as the carrier 50 moves longitudinally relative to the base 130. Details of embodiments and variations employing such principles will be discussed in more detail below.

Figure 1A:
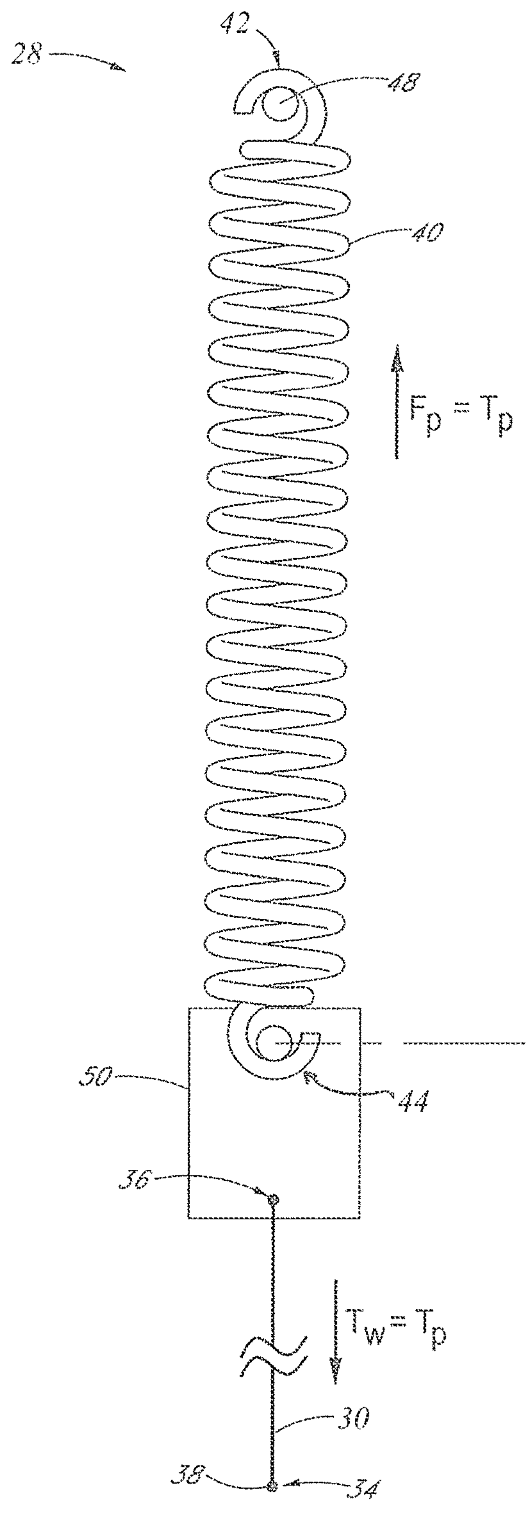
FIG. 1A shows a schematic representation of a spring arrangement.

With initial reference to FIG. 1A, a spring-based tension device 28 comprises a wire or string 30 that has a fixed end 34 and a movable end 36, and a primary spring 40 has a fixed end 42 and a movable end 44. The fixed end 34 of the wire 30 is mounted on a fixed wire mount 38; the fixed end 42 of the primary spring 40 is mounted on a fixed spring mount 48. The primary spring 40 has a spring constant k. The movable ends of the wire 30 and primary spring 40 are both attached at a carrier 50 (or attachment point) so that the primary spring 40 and wire 30 are coaxial. The primary spring 40 pulls on the wire 30 so that the force Fp in the primary spring 40 is identical to the tension Tw in the wire. In this embodiment, a preferred tension is Tp. In FIG. 1A, Fp=Tw=Tp.

Figure 1B:
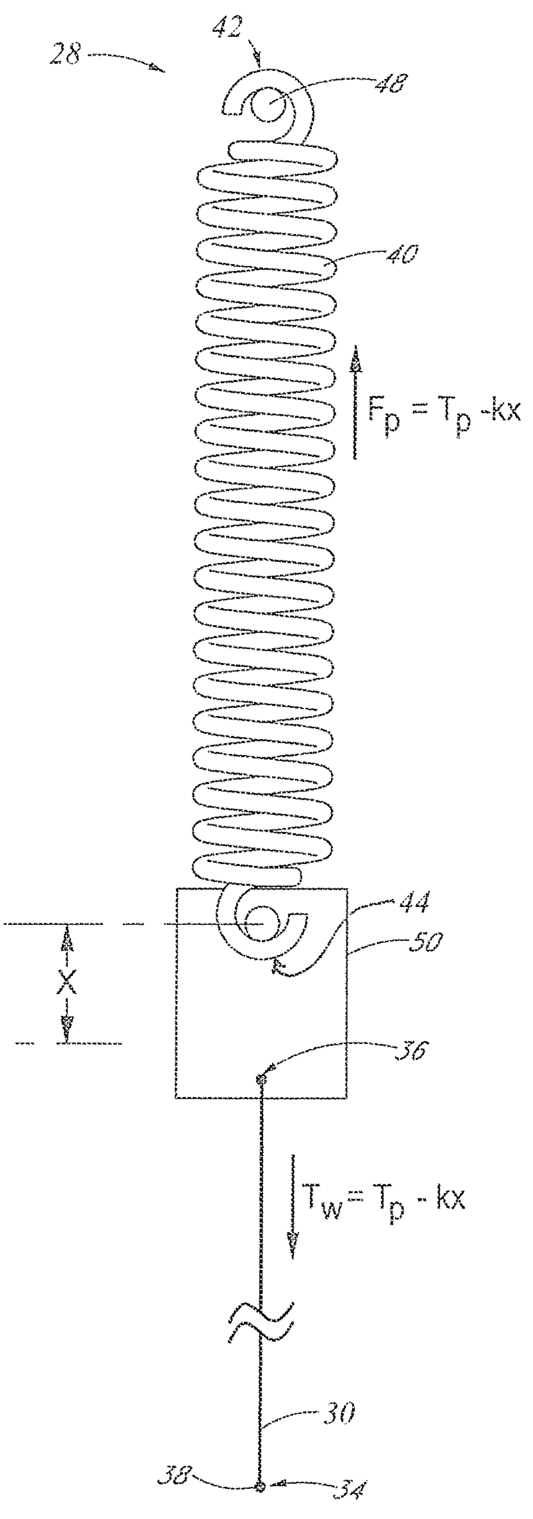
FIG. 1B shows the spring arrangement of FIG. 1A in a configuration in which a string has stretched.

Over time, the wire 30 may stretch or contract. FIG. 1B illustrates such a situation, as the wire 30 has stretched an axial distance x. Since the spring 40 follows Hooke's law, the force in the spring 40 is reduced by −kx, causing a corresponding change to the tension in the wire Tw. Thus, Fp=Tw=Tp−kx. As such, the tension in the wire 30 is no longer at the preferred tension Tp. Notably, Hooke's law (F=−kx) is a linear function.

Figure 2B:
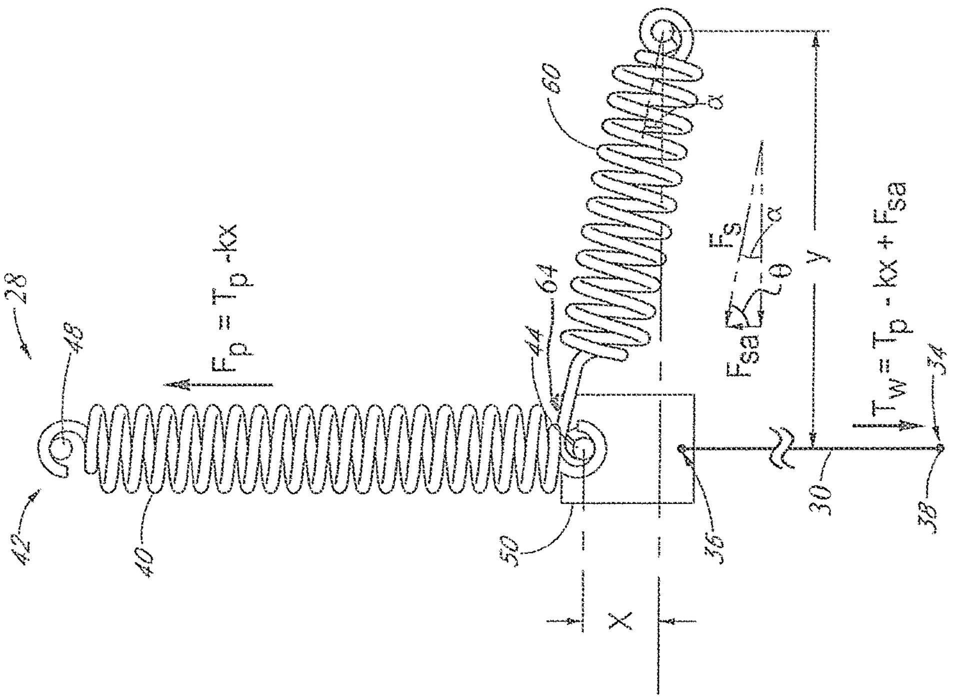
FIG. 2B shows the spring arrangement of FIG. 2A in a configuration in which a string has stretched.
Figure 2A:
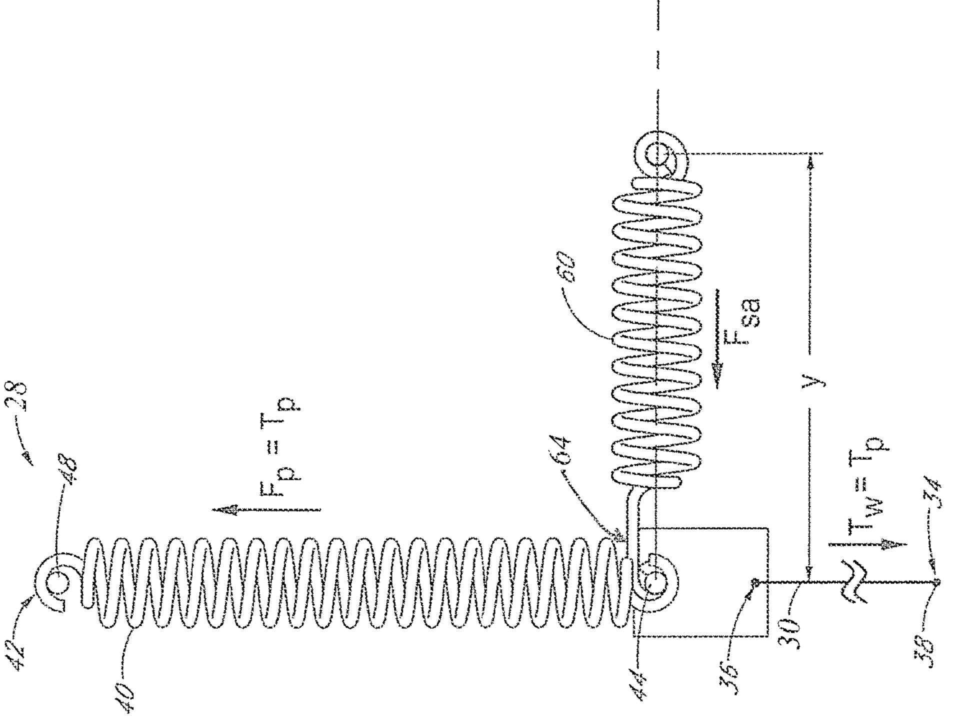
FIG. 2A shows a schematic representation of a spring arrangement in accordance with one embodiment.

FIGS. 2A-B illustrate another embodiment of a spring-based tension device 28 for maintaining the tension in the wire 30 at or near the preferred tension Tp. A secondary spring 60 has a fixed end 62 and a movable end 64. The fixed end 62 is attached to a secondary spring mount 68. The movable end 64 of the secondary spring 60 is attached to the movable ends 36, 44 of the primary spring 40 and wire 30 at the carrier 50. As shown in FIG. 2A, the secondary spring 60 exerts a force Fs which, in the initial position shown in FIG. 2A, is directed normal to the force Fp as applied by the primary spring 60 to the wire 30. Preferably the carrier 50 is constrained so as to move only along a path that is coaxial with the primary spring 40 and the wire 30. Since Fs is directed normal to the attachment point in FIG. 2A, Fs has a vector force component Fsa of zero (0) along the axis. As such, secondary spring force Fs does not affect Tw.

With reference next to FIG. 2B, as discussed above in connection with FIG. 1B, over time the wire 30 may stretch, resulting in a reduction (by kx) of the primary force Fp applied by the primary spring 40 to the wire 30. However, since the carrier 50 moves along the axis a distance x, the secondary spring 60 is rotated an angle $\alpha$ about its fixed end 62. The secondary force Fs is no longer directed normal to the axis, but has an axial vector component (Fsa) determined by the equation Fs (sin $\alpha$). As such, the tension in the wire is calculated as Tw=Tp-kx+Fs (sin $\alpha$). Note that Fsa can also be determined by Fs (cos $\theta$), thus Tw=Tp-kx+Fs (cos $\theta$).

At relatively low angles of $\alpha$, such as from about 0-20°, more preferably 0-15°, still more preferably 0-10° and most preferably 0-5°, sin $\alpha$ is a substantially linear function. As noted above, −kx is a totally linear function, in which the primary spring rate k is a constant, and the function is negative. Thus, over such relatively low angles of a, a secondary spring force Fs can be chosen so that over an operating range of deflection (x), the value of a function k(s)x is approximated by Fs (sin$\alpha$), and a secondary axial spring rate k(s) changes with $\alpha$ and the spring rate function is positive. As such, over the operating range shown in FIG. 2B, as the wire 30 elongates, the force Fp applied by the primary spring 40 decreases, but the axial force component Fsa of the force Fs applied by the secondary spring correspondingly increases, and is directed in the same axial direction as the primary force. As a result, the total tension on the wire Tw remains at or near the preferred tension Tp. Notably, the secondary axial spring rate k(s) at these ranges of a is positive, opposing the negative primary spring rate. Thus, if the wire of FIG. 2B were to contract in length such that a became negative, the tension force applied by the primary spring Fp would increase, but the compressive axial force component Fsa of the force Fs applied by the secondary spring would be directed opposite Fp and have a similar value. As a result, the total tension on the wire Tw would remain at or near the preferred tension Tp.

Table 1 below presents a spreadsheet that demonstrates a real-life scenario of operation of one embodiment having structure as depicted in FIGS. 2A-2B. In the scenario depicted in Table 1, primary spring 40 (Spring 1), secondary spring 60 (Spring 2) and string 30 are attached as represented in FIGS. 2A-B. The primary spring (Spring 1) has a spring rate (k1) of 64 pounds per inch. The secondary spring (Spring 2) is in compression and has a spring rate (k2) of 10 lb./in. The range of travel of the attachment point (carrier 50) is 0.0625 in. In this embodiment the secondary spring (Spring 2) has an initial length y of 0.3 in. and is compressed to have an initial tension (Fs) of 19.7 lb. In this scenario, the initial position of the secondary spring 60 is normal to the primary spring 40.

TABLE 1

| Spring 1 Length | Fp | Spring 2 Length | Fs | Theta (rad) | Fsa | Tw | % Tw change | Theta (deg) | alpha (deg) |
|---|---|---|---|---|---|---|---|---|---|
| 1.4000 | 10.0000 | 0.3000 | 19.7000 | 1.5708 | 0.0000 | 10.0000 | 0.0000 | 90.0000 | 0.0000 |
| 1.3938 | 9.6000 | 0.3001 | 19.6993 | 1.5916 | 0.4103 | 10.0103 | 0.1031 | 91.1935 | 1.1935 |
| 1.3875 | 9.2000 | 0.3003 | 19.6974 | 1.6124 | 0.8200 | 10.0200 | 0.2001 | 92.3859 | 2.3859 |
| 1.3813 | 8.8000 | 0.3006 | 19.6941 | 1.6332 | 1.2285 | 10.0285 | 0.2849 | 93.5763 | 3.5763 |
| 1.3750 | 8.4000 | 0.3010 | 19.6896 | 1.6539 | 1.6351 | 10.0351 | 0.3513 | 94.7636 | 4.7636 |
| 1.3688 | 8.0000 | 0.3016 | 19.6838 | 1.6746 | 2.0394 | 10.0394 | 0.3936 | 95.9469 | 5.9469 |
| 1.3625 | 7.6000 | 0.3023 | 19.6767 | 1.6952 | 2.4406 | 10.0406 | 0.4059 | 97.1250 | 7.1250 |
| 1.3563 | 7.2000 | 0.3032 | 19.6683 | 1.7156 | 2.8383 | 10.0383 | 0.3827 | 98.2971 | 8.2971 |
| 1.3500 | 6.8000 | 0.3041 | 19.6586 | 1.7359 | 3.2319 | 10.0319 | 0.3186 | 99.4623 | 9.4623 |
| 1.3438 | 6.4000 | 0.3052 | 19.6477 | 1.7561 | 3.6208 | 10.0208 | 0.2085 | 100.6197 | 10.6197 |
| 1.3375 | 6.0000 | 0.3064 | 19.6356 | 1.7762 | 4.0048 | 10.0048 | 0.0476 | 101.7683 | 11.7683 |

In the scenario depicted in Table 1, the tension Fp initially in primary spring (Spring 1)—and thus the preferred tension Tp in the wire—is 10 lb., and the initial length L1 of the primary spring 40 is 1.4 in. The spreadsheet simulates an application such as a guitar in which the springs apply the tension to a guitar string, and over time the guitar string stretches (here over a range of travel of 0.0625 in.). The spreadsheet shows the state of the springs and tension in the wire/guitar string at various points along the 0.0625 range of travel.

As shown in FIGS. 2A-2B and as represented in Table 1, as the string 30 stretches, the carrier 50 and associated attachment point moves. As a result, the primary spring 40 (Spring 1) decreases in length a distance x and the primary force Fp correspondingly decreases. However, secondary spring 60 (Spring 2) rotates, thus increasing the axially-directed component force Fsa, which is computed as Fscosθ or Fssinα. Notably, the length L2 of spring 2 will change slightly with the rotation (computed as ((y^2+x^2)^½), and thus Fs will change slightly due to the Spring 2 spring rate.

In the scenario depicted in Table 1, over a string stretch of 0.0625 in., secondary spring 60 (Spring 2) rotates almost 12 degrees, and the total tension in the wire (Tw) varies from the preferred (initial) tension Tp by at most about 0.4%. Such a variance would result in minimal, if any, audible changes in guitar string tune.

It is to be understood that various lengths, spring rates, etc. can be selected for the primary and secondary springs in order to vary specific results, but the principle remains that the secondary spring is chosen to approximate the linear change in tension applied by the primary spring as the primary spring moves linearly and the secondary spring (or at least the line of action of the secondary spring) changes such that the rate of change of the axially-directed component force approximately negates the rate of change of the primary spring force.

Figure 3:
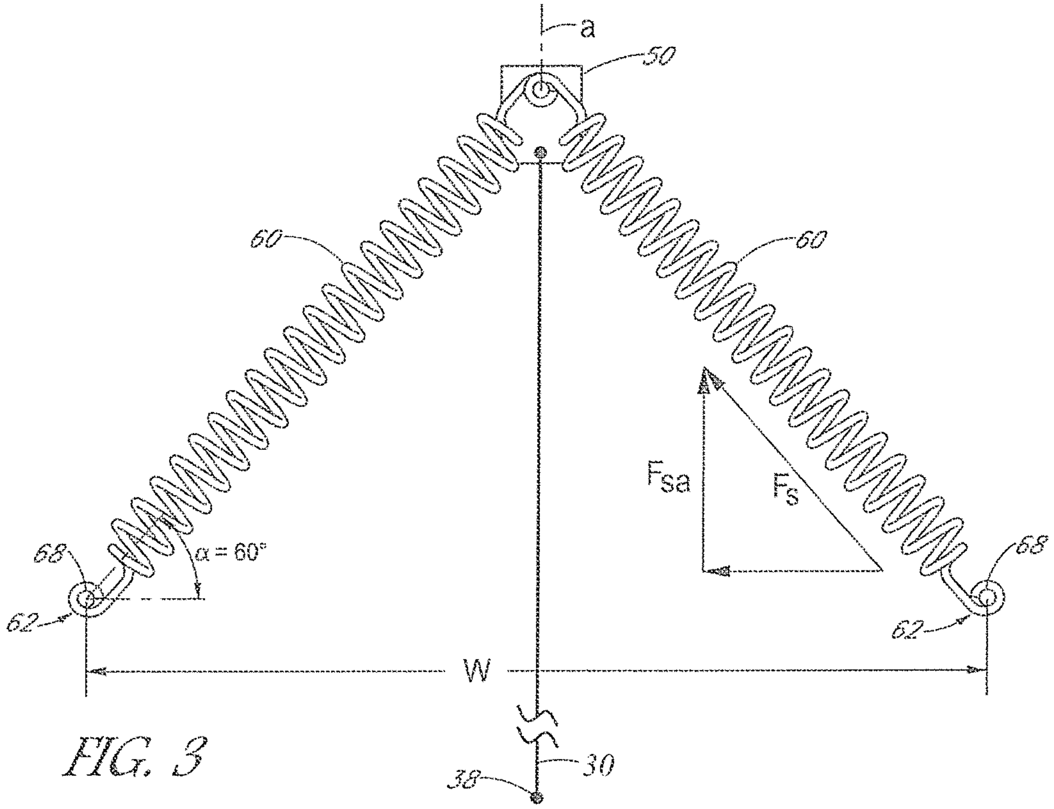
FIGS. 3-5 show a schematic representation of a spring arrangement in accordance with another embodiment, shown at three positions.

With reference next to FIG. 3, in another embodiment, opposing spring mounts 68 are fixed relative one another and are spaced a width w from one another. A pair of identical springs 60 are provided, with a fixed end 62 of each spring attached to a respective one of the fixed spring mounts 68 and a movable end 44 attached to a carrier 50 that is configured to translate linearly along an axis a. As shown, the springs 60 preferably are arranged symmetrically about the axis. A wire 30 or the like can be attached to the carrier 50.

In the embodiment illustrated in FIG. 3, each spring 60 has an angle α relative to a line normal to the axis a. In FIG. 3, α=60°. With additional reference to FIGS. 4 and 5, and also reference to Table 2 below, as the carrier 50 moves along the axis a, the angle α decreases, as does the length of the springs 60 and axial force component Fsa of each spring, as the springs are placed into compression. Still further, as demonstrated in Table 2, the effective spring rate of each spring 60 along the axis also changes with a.

In Table 2 below, an example is presented in which the springs 60 are initially arranged so that α=60°, and the at-rest length of the springs is 2.0 in. The example spring has a spring rate k of 90 lb./in. and the width w between the fixed spring mounts 68 is 2.0 in., so that each fixed spring mount is 1.0 in. from the axis. Table 2 shows how various aspects of this arrangement change as the carrier 50 moves linearly along the axis a as demonstrated in FIGS. 3-5. Specifically, as a decreases, the length L of each spring decreases, and each spring is placed into compression, exerting spring force Fs. The spring force can be broken into components, including the axial component of force Fsa. With each decrease of one degree of a there is a corresponding incremental change in axial distance moved by the carrier 50. The axial force Fsa divided by the incremental axial distance indicates an axial spring rate ka at that point along the movement of the springs. Thus, as shown in Table 2, the axial spring rate changes with a.

TABLE 2

| Alpha (deg) | Length L | Spring Force F | Axial Force Fa | Axial distance | Axial Spring Rate ka |
|---|---|---|---|---|---|
| 60 | 2.0000 | 0.0000 | 0.0000 | | |
| 59 | 1.9416 | 5.2556 | 4.5050 | 0.0678 | −66.4730 |
| 58 | 1.8871 | 10.1628 | 8.6185 | 0.0639 | −64.3302 |
| 57 | 1.8361 | 14.7529 | 12.3729 | 0.0605 | −62.0859 |
| 56 | 1.7883 | 19.0538 | 15.7963 | 0.0573 | −59.7414 |
| 55 | 1.7434 | 23.0898 | 18.9140 | 0.0544 | −57.2983 |
| 54 | 1.7013 | 26.8829 | 21.7487 | 0.0518 | −54.7586 |
| 53 | 1.6616 | 30.4524 | 24.3204 | 0.0493 | −52.1245 |
| 52 | 1.6243 | 33.8158 | 26.6472 | 0.0471 | −49.3986 |
| 51 | 1.5890 | 36.9886 | 28.7455 | 0.0450 | −46.5837 |
| 50 | 1.5557 | 39.9849 | 30.6302 | 0.0431 | −43.6832 |

TABLE 2-continued

| Alpha (deg) | Length L | Spring Force F | Axial Force Fa | Axial distance | Axial Spring Rate ka |
|---|---|---|---|---|---|
| 49 | 1.5243 | 42.8172 | 32.3146 | 0.0414 | −40.7003 |
| 48 | 1.4945 | 45.4971 | 33.8109 | 0.0398 | −37.6391 |
| 47 | 1.4663 | 48.0349 | 35.1305 | 0.0382 | −34.5034 |
| 46 | 1.4396 | 50.4399 | 36.2834 | 0.0368 | −31.2976 |
| 45 | 1.4142 | 52.7208 | 37.2792 | 0.0355 | −28.0263 |
| 44 | 1.3902 | 54.8853 | 38.1265 | 0.0343 | −24.6944 |
| 43 | 1.3673 | 56.9405 | 38.8333 | 0.0332 | −21.3069 |
| 42 | 1.3456 | 58.8931 | 39.4071 | 0.0321 | −17.8692 |
| 41 | 1.3250 | 60.7488 | 39.8548 | 0.0311 | −14.3866 |
| 40 | 1.3054 | 62.5133 | 40.1828 | 0.0302 | −10.8650 |
| 39 | 1.2868 | 64.1916 | 40.3971 | 0.0293 | −7.3103 |
| 38 | 1.2690 | 65.7884 | 40.5034 | 0.0285 | −3.7283 |
| 37 | 1.2521 | 67.3078 | 40.5068 | 0.0277 | −0.1255 |
| 36 | 1.2361 | 68.7539 | 40.4125 | 0.0270 | 3.4919 |
| 35 | 1.2208 | 70.1303 | 40.2251 | 0.0263 | 7.1174 |
| 34 | 1.2062 | 71.4404 | 39.9490 | 0.0257 | 10.7445 |
| 33 | 1.1924 | 72.6873 | 39.5883 | 0.0251 | 14.3665 |
| 32 | 1.1792 | 73.8739 | 39.1472 | 0.0245 | 17.9767 |
| 31 | 1.1666 | 75.0030 | 38.6294 | 0.0240 | 21.5683 |
| 30 | 1.1547 | 76.0770 | 38.0385 | 0.0235 | 25.1345 |
| 29 | 1.1434 | 77.0981 | 37.3779 | 0.0230 | 28.6686 |
| 28 | 1.1326 | 78.0687 | 36.6510 | 0.0226 | 32.1636 |
| 27 | 1.1223 | 78.9906 | 35.8610 | 0.0222 | 35.6128 |
| 26 | 1.1126 | 79.8658 | 35.0109 | 0.0218 | 39.0094 |
| 25 | 1.1034 | 80.6960 | 34.1036 | 0.0214 | 42.3467 |
| 24 | 1.0946 | 81.4827 | 33.1420 | 0.0211 | 45.6182 |
| 23 | 1.0864 | 82.2276 | 32.1289 | 0.0208 | 48.8171 |
| 22 | 1.0785 | 82.9319 | 31.0668 | 0.0204 | 51.9372 |
| 21 | 1.0711 | 83.5970 | 29.9585 | 0.0202 | 54.9721 |
| 20 | 1.0642 | 84.2240 | 28.8063 | 0.0199 | 57.9157 |
| 19 | 1.0576 | 84.8141 | 27.6128 | 0.0196 | 60.7619 |
| 18 | 1.0515 | 85.3684 | 26.3803 | 0.0194 | 63.5048 |
| 17 | 1.0457 | 85.8877 | 25.1111 | 0.0192 | 66.1389 |
| 16 | 1.0403 | 86.3731 | 23.8076 | 0.0190 | 68.6587 |
| 15 | 1.0353 | 86.8251 | 22.4720 | 0.0188 | 71.0590 |
| 14 | 1.0306 | 87.2448 | 21.1064 | 0.0186 | 73.3347 |
| 13 | 1.0263 | 87.6326 | 19.7131 | 0.0185 | 75.4812 |
| 12 | 1.0223 | 87.9893 | 18.2940 | 0.0183 | 77.4939 |
| 11 | 1.0187 | 88.3155 | 16.8514 | 0.0182 | 79.3685 |
| 10 | 1.0154 | 88.6116 | 15.3872 | 0.0181 | 81.1013 |
| 9 | 1.0125 | 88.8781 | 13.9036 | 0.0179 | 82.6884 |
| 8 | 1.0098 | 89.1155 | 12.4025 | 0.0178 | 84.1266 |
| 7 | 1.0075 | 89.3241 | 10.8859 | 0.0178 | 85.4127 |
| 6 | 1.0055 | 89.5043 | 9.3557 | 0.0177 | 86.5442 |
| 5 | 1.0038 | 89.6562 | 7.8141 | 0.0176 | 87.5185 |
| 4 | 1.0024 | 89.7802 | 6.2628 | 0.0176 | 88.3336 |
| 3 | 1.0014 | 89.8765 | 4.7038 | 0.0175 | 88.9878 |
| 2 | 1.0006 | 89.9451 | 3.1390 | 0.0175 | 89.4797 |
| 1 | 1.0002 | 89.9863 | 1.5705 | 0.0175 | 89.8082 |
| 0 | 1.0000 | 90.0000 | 0.0000 | 0.0175 | 89.9726 |
| −1 | 1.0002 | 89.9863 | −1.5705 | 0.0175 | 89.9726 |
| −2 | 1.0006 | 89.9451 | −3.1390 | 0.0175 | 89.8082 |
| −3 | 1.0014 | 89.8765 | −4.7038 | 0.0175 | 89.4797 |
| −4 | 1.0024 | 89.7802 | −6.2628 | 0.0175 | 88.9878 |
| −5 | 1.0038 | 89.6562 | −7.8141 | 0.0176 | 88.3336 |

Figure 4:
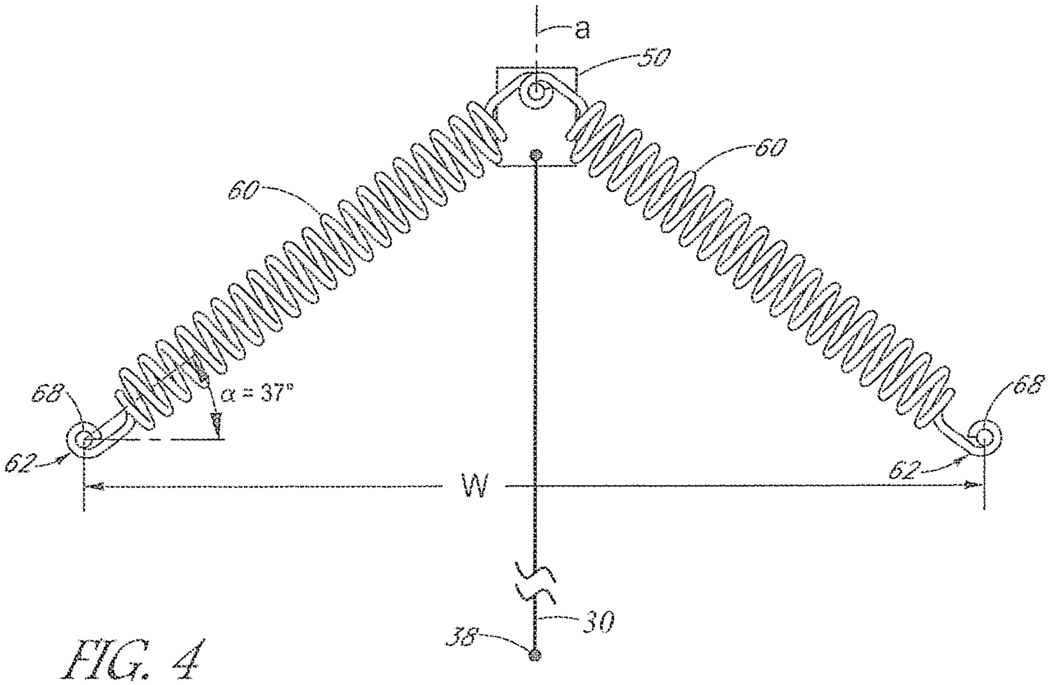
Figure 5:
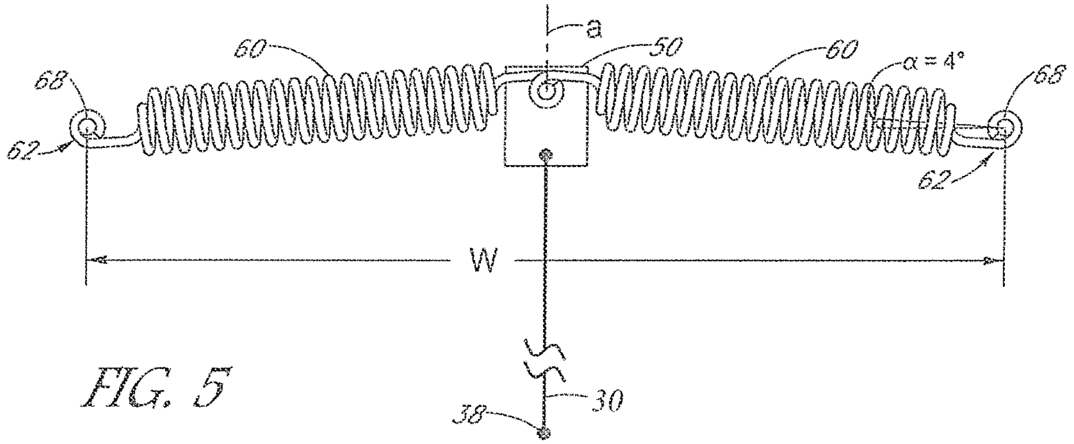

With specific reference next to FIG. 4 and Table 2, when a is about 37°, the incremental axial spring rate transitions from a negative spring rate to a positive spring rate. Also, with reference to FIG. 5 and Table 2, the incremental spring rate at angles near α=0° is nearly constant and, in the illustrated embodiment, positive. More specifically, in the zone around α=0° from about α−5° to α=−5°, the spring rate is generally constant.

Figure 6:
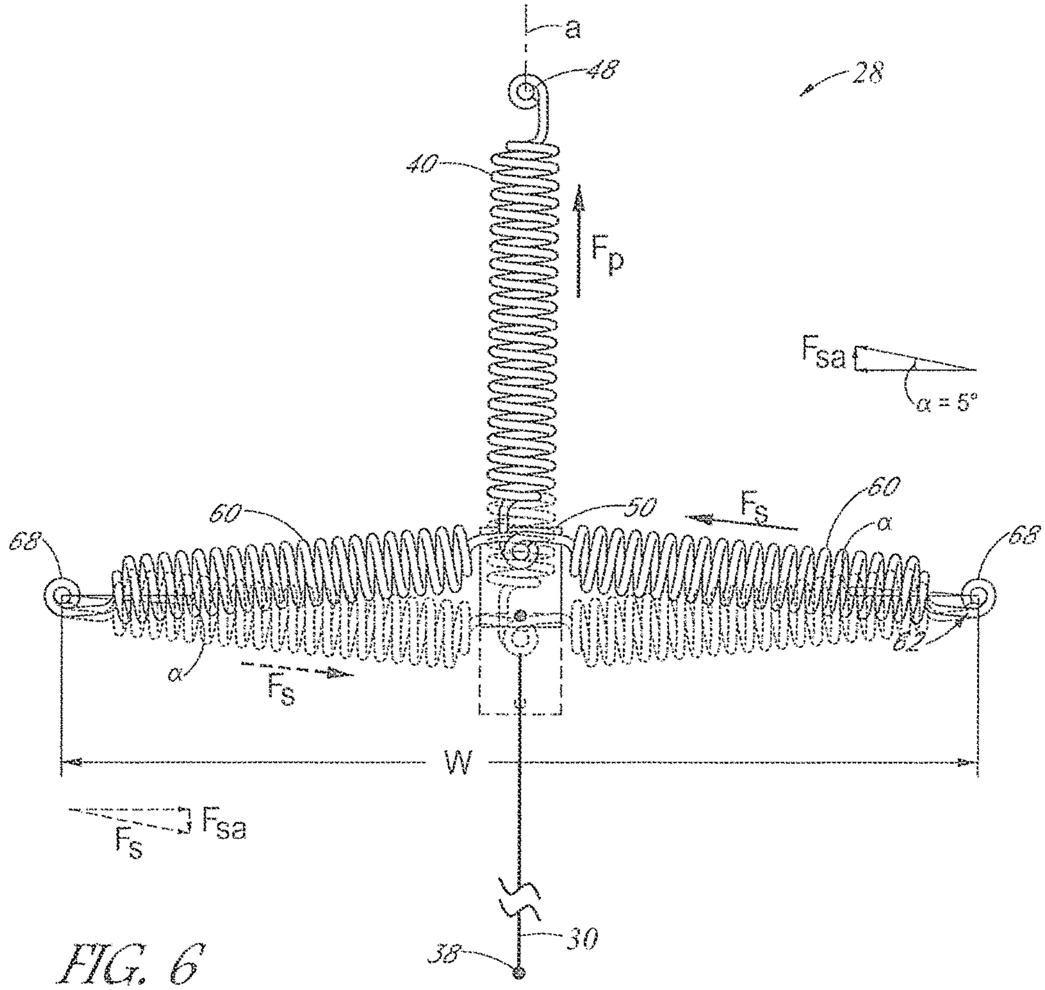
FIG. 6 shows a schematic representation of another spring arrangement in accordance with yet another embodiment.

With reference next to FIG. 6, in another embodiment, a primary, axially-directed spring 40 is attached to the carrier 50 and adapted to supply a primary spring force Fp to a wire 30, which is also attached to the carrier 50, in a manner similar to the embodiment of FIG. 2. In FIG. 6, opposing identical secondary springs 60 are arranged as the springs 60 are in FIGS. 3-5. In this embodiment, the primary spring 40 follows Hooke's law and thus has a constant spring rate k. As shown, the secondary springs 60 are disposed in a range of α=0±5°, in which the axial component of Force Fsa of the secondary springs 60 is a function of sinα, which is a nearly-linear function at small angles such as α=0±5°. As such, in a preferred embodiment, the secondary springs 60 can be selected to have a spring constant so that their axial force component Fsa generally follows and compensates for the linear reduction of the primary axial spring force Fp as the carrier 50 moves axially when the wire 30 (or musical string in some embodiments) stretches or contracts over time. As such, the tension Tw in the wire 30 remains generally the same during such stretching or contracting. In a preferred embodiment, such force compensation operates within an operational range, such as α=0±5°. Depending on the requirements of the application, the operational range may be narrower, such as α=0±3°, or larger, such as within α=0±10°, α=0±15°, or even α=0±20°.

With continued reference to FIG. 6 and reference again to Table 2, in a preferred embodiment, since the spring rate of each secondary spring 60 at and around α=0° approaches 90 lb./in., the total spring rate of the two secondary springs 60 combined approaches 180 lb./in. In one such embodiment, the primary spring 40 is selected to have a spring rate of −180 lb./in. As such, in the operational range of about α=0° relative to the opening, the primary spring 40 has a spring rate of about-180 lb./in. in tension, while the secondary springs combine to provide an axial spring rate in compression of about 180 lb./in. The combined spring rate, then, approaches zero, which results in the change in force applied by the tension device 28 approaching zero in the operational range about α=0°.

More specifically, in the embodiment depicted in FIG. 6 and Table 2, when the carrier 50 moves from α=0° to α=1°, it moves axially 0.017455 in. Thus, the tension applied by the primary spring 40 reduces by (180 lb./in.) (0.017455 in.)=3.1419 lb. However, the axial component Fsa of force provided by the two secondary springs 60 is 2 (1.57048 lb.)=3.1410 lb. Thus, the net change in tension as the carrier 50 moves from α=0° to α=1° is only 0.0009 lb. With additional reference to Table 3, the net axial spring rate ka for α=0±5° is calculated by adding the combined axial spring rate of the secondary springs 60 to the primary spring rate (here 180 lb./in.).

TABLE 3

| Alpha (deg) | Net Spring Rate |
|---|---|
| 5 | −4.9630 |
| 4 | −3.3328 |
| 3 | −2.0244 |
| 2 | −1.0407 |
| 1 | −0.3837 |
| 0 | −0.0548 |
| −1 | −0.0548 |
| −2 | −0.3837 |
| −3 | −1.0407 |
| −4 | −2.0244 |
| −5 | −3.3328 |

In view of Table 3, over a range of α=−4° to 4°, the net axial spring rate ka averages about-1.15 lb./in. Over a range of a range of α=−5° to 4°, the net axial spring rate averages about −1.37 lb./in. Over a range of α=−5° to 5°, the net axial spring rate averages about −1.69 lb./in.

Figure 7:
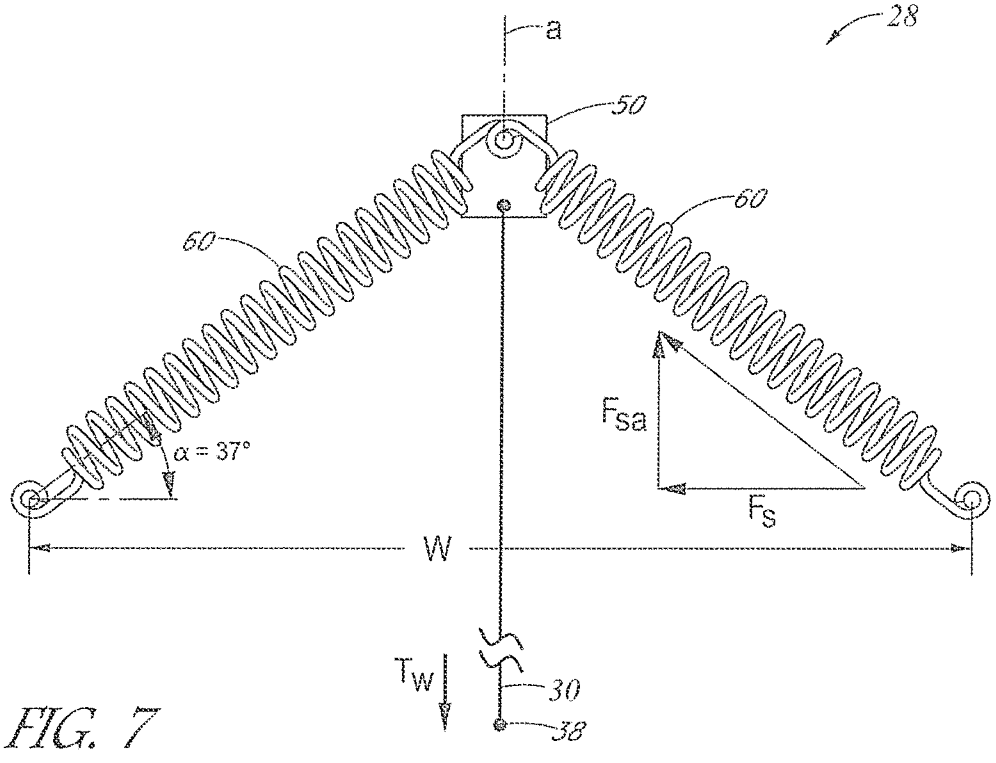
FIG. 7 shows a schematic representation of still another spring arrangement in accordance with another embodiment.

With reference next to FIG. 7, in another embodiment the operational range of a spring-based tension device 28 can be arranged to straddle the zone of zero spring rate, at which the spring rate transitions from a negative spring rate to a positive spring rate. Since the magnitude of spring rate reverses in this range, the net average spring rate can be constrained within a desired range. As such, the change in the net axial force component of the secondary springs in the operational range encompassing the zero spring rate transition can approximate the change in primary spring force as the carrier moves through this zone. An operational range thus can be defined about the angle corresponding to the point of zero spring rate. In the embodiment described in the table, the spring rate approaches zero at about $\alpha=37°$. In some embodiments an operational range is defined ±1°, ±2°, ±4°, $\alpha=0\pm5\text{-}7°$ or about +10° about the angle of zero spring rate. At the position of zero spring rate, incremental changes in axial position incur no change in force applied. Thus only the springs 60 are needed in this embodiment.

Figure 8:
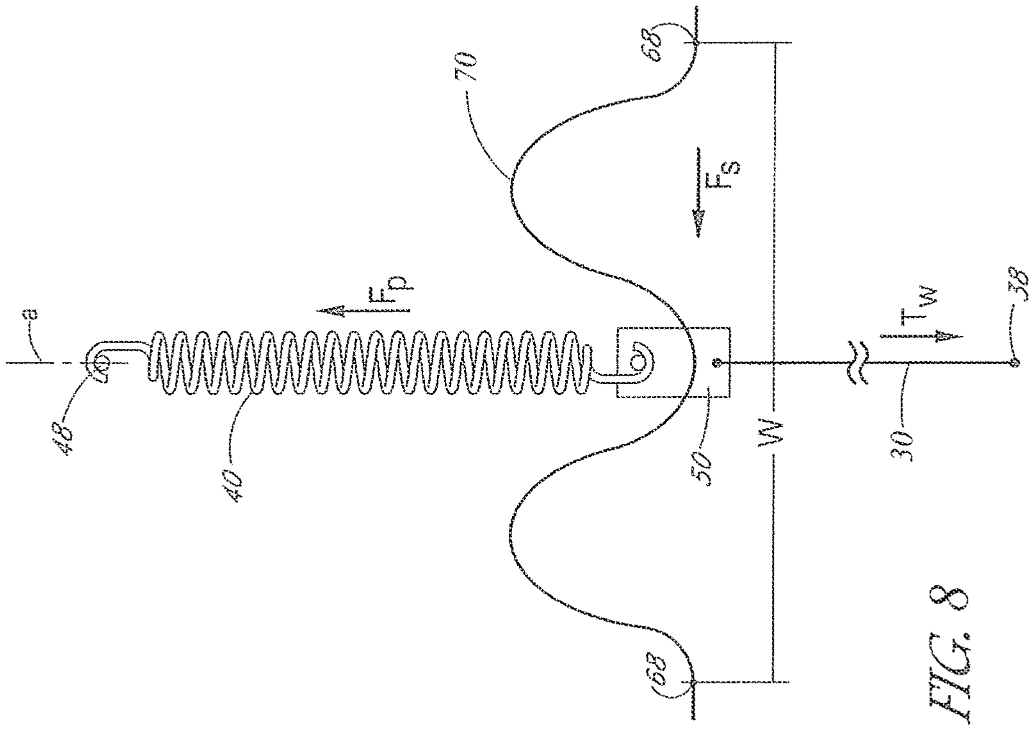
FIG. 8 is a schematic representation of a spring arrangement configured in accordance with yet another embodiment.

With reference next to FIG. 8, another embodiment is schematically represented in which a primary spring 40 comprises a coil spring held in tension and connected to the string 30 via a carrier 50 configured to move linearly along the axis a. A secondary spring 70 is constructed from a flat piece of spring steel having a length greater than a width between spring mounts 68, to which the flat spring 70, or leaf spring, is attached. A center of the flat spring 70 is also attached to the carrier 50, and the flat spring 70 is compressed so that it bows outwardly as shown and fits within the width of the device. As shown, due to such compression the flat sheet 70 is deflected into two symmetrical curves, one on each side of the axis. As shown in FIG. 8, each curve provides a secondary spring force Fs in compression and directed transverse to the axis. In the illustrated embodiment the secondary spring force is directed in a direction in which $\alpha=0°$. As the string lengthens or contracts, the carrier 50 will move axially, and the secondary spring force will adopt an axial component Fsa that will at least partially compensate for the change in axial force exerted by the primary spring 40 as discussed above.

Figure 9:
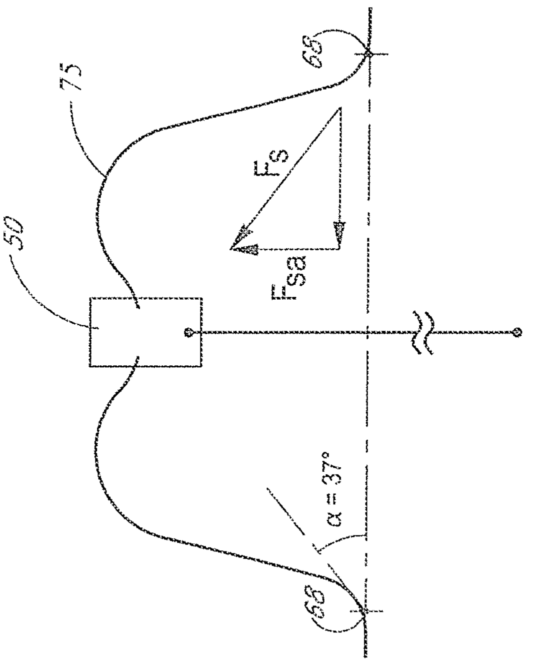
FIG. 9 is a schematic representation of a spring arrangement configured in accordance with still another embodiment.

With reference next to FIG. 9, in another embodiment, a flat spring sheet 75 of spring steel can be used to configure a tension device in which the secondary spring force is directed in a direction generally corresponding to the angle of deflection corresponding to the zero spring rate position. As discussed above in connection with FIG. 7, no primary spring is necessary in an embodiment operating around the zero spring rate position.

Figure 10:
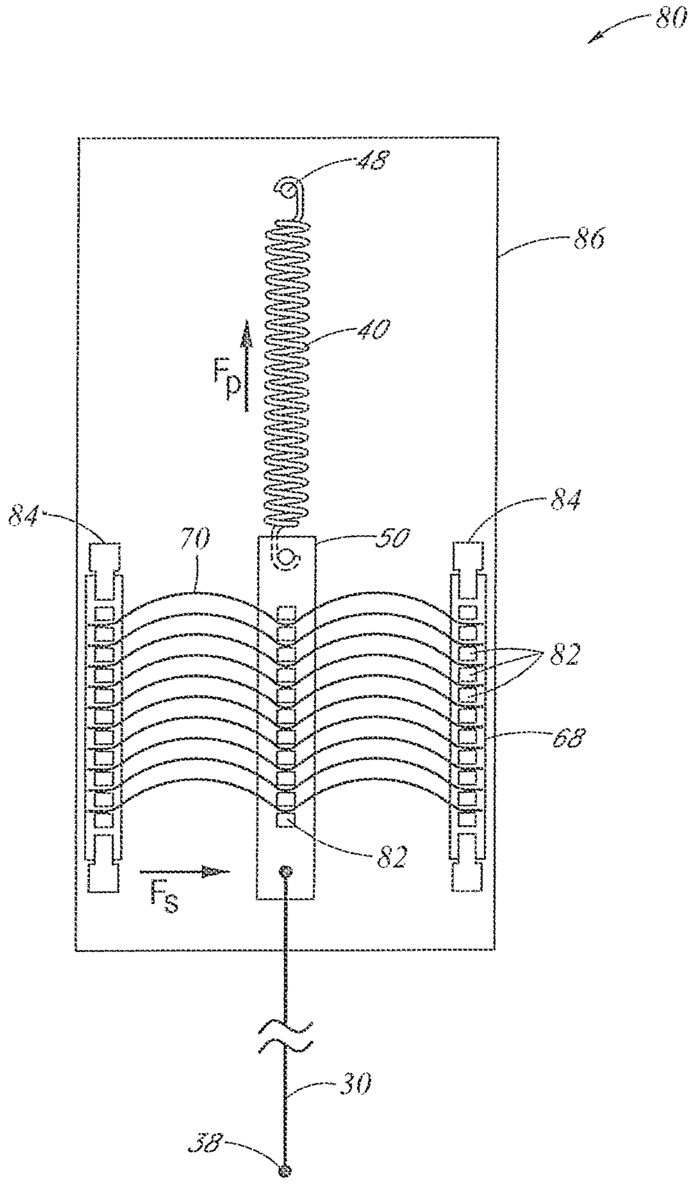
FIG. 10 shows an embodiment of a tension device employing features as in the embodiment illustrated in FIG. 8.

With reference next to FIG. 10, another embodiment is illustrated in which a tension device 80 employs a configuration resembling that of FIG. 8, except that multiple deflected flat sheets 70, or leaves, are provided to, in sum, provide the desired secondary spring force Fs. In the illustrated embodiment the fixed string mounts 68 comprises spacers 82 to keep adjacent sheets 70 of spring steel spaced from one another, but held securing within a clamp 84 of the mount 68. Similarly, in this embodiment the carrier 50 is elongate and comprises several spacers 82 that maintain a space between adjacent sheets 70 of spring steel. A clamp disposed on the carrier 50 also can hold the springs 70 and spacers on 62 in place. In some embodiments the spacers 82 comprise flat pieces of spring steel that can be replaced as needed or desired. In another embodiment layers of spring steel can be engaged with one another.

In the embodiment illustrated in FIG. 10, the multiple deflected sheets or leaves 70 of spring steel combine to provide a desired secondary spring force Fs. In the illustrated embodiment the primary coil spring 40 has a spring rate of 91 lb./in., and the secondary spring comprises 10 half-inch wide strips 70 of 3 mil thick spring steel. Half an inch of the length of each sheet is deflected within a space of about 0.3 inch between the carrier 50 and the mount 68. The mount preferably is incorporated into a frame 86 that, in the illustrated embodiment, has a width of about 0.66 in. total, a length of about 2.3 in., and a height of about 0.665 in.

Tension devices 80 as described herein may be particularly useful for applying tension to musical strings of musical instruments such as guitars. Thus, in some embodiments, a plurality of the tension devices 80 can be mounted side-by-side on a guitar.

Figure 11:
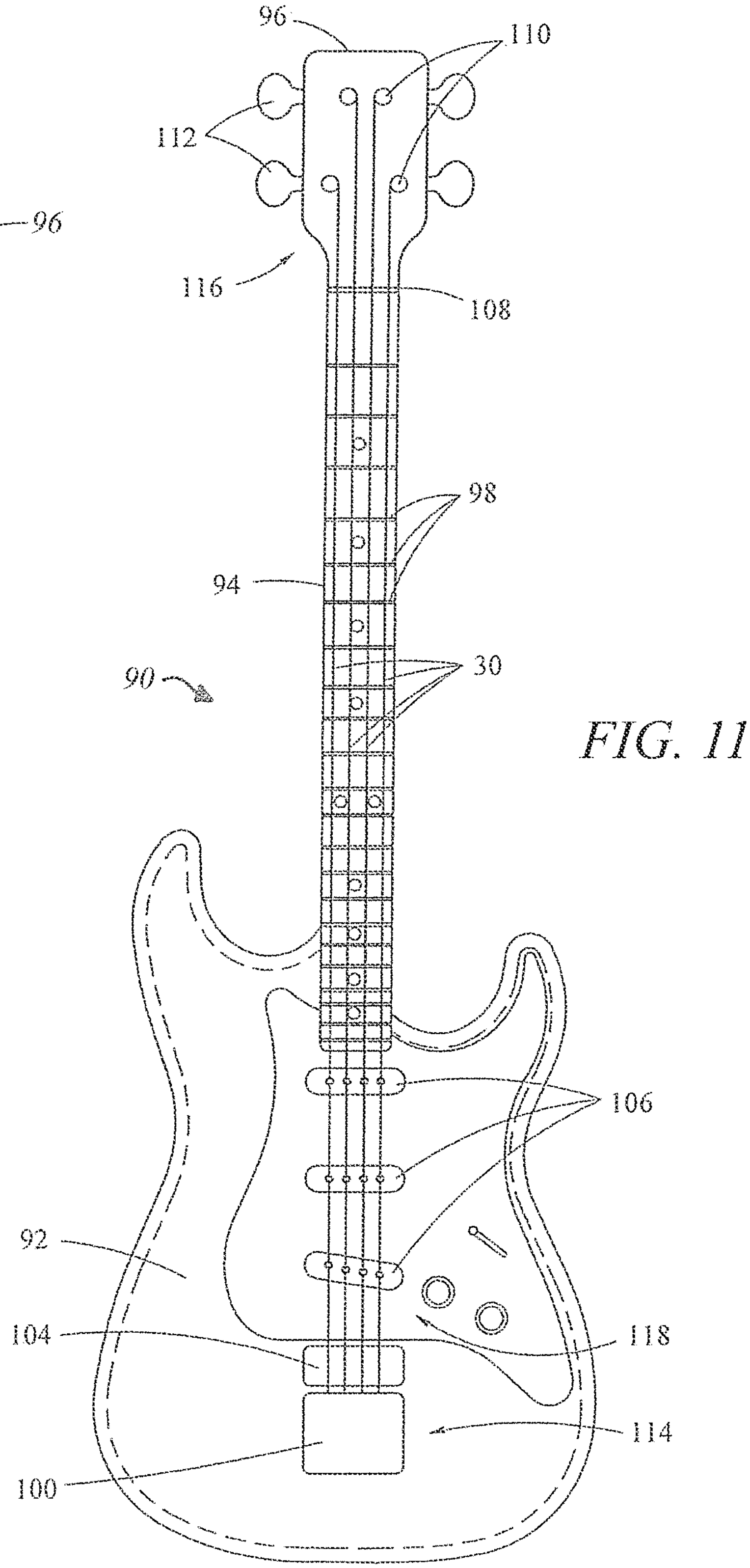
FIG. 11 is a plan view of a four-string bass electric guitar schematically incorporating a modular bridge and a modular string holder in accordance with one embodiment.

With reference next to FIG. 11, a guitar 90 is illustrated. The illustrated guitar 90 comprises a body 92 from which an elongated neck 94 extends, which neck extends to a head 96. As is typical with guitars, frets 98 can be provided along the neck 94. Musical strings 30 traverse the body 92, neck 94 and head 96 of the guitar 90, and preferably are held in tension. More specifically, proximal ends of the strings 30 are held securely by a string holder 100 and then pass over a bridge 104. The string holder 100 can comprise plural tension devices 80, one for each string 30. In some embodiments the string holder and bridge can be incorporated into a single system. Pickups 106 on the body 92 are configured to sense string vibrations above the guitar body 92. The strings 30 traverse the neck 94, extend over a head nut 108, and are each wound about an axle 110, which axle 110 preferably is controlled by turning a corresponding tuning peg 112. As with conventional guitars, by turning the tuning pegs 112, and thus also turning the axles 110, each string 30 can be tightened to an appropriate tension corresponding to a desired string tune A body string connection zone 114 is defined proximal of the bridge 104 and a head string connection zone 116 is defined distal of the nut 108. A playing zone 118 is defined between the bridge 104 and nut 108. String vibrations in the playing zone 118 are isolated from string vibrations in the body connection zone 114 and head connection zone 116 by the bridge 104 and head nut 108, respectively.

Figure 12:
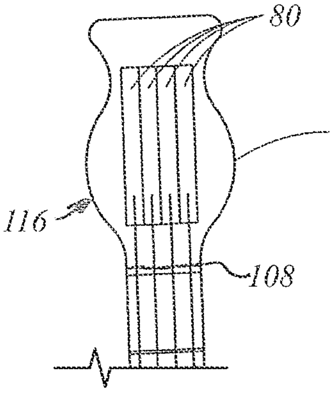
FIG. 12 is a partial view of a headstock portion of another embodiment of a bass guitar employing tension devices on a headstock of the guitar.

The example frame width of 0.66 in. and the selected spring rate discussed above in accordance with the embodiment of FIG. 10 approximates the spacing between strings in a typical electric bass guitar, and the desired force of an example bass guitar string. With reference next to FIG. 12, a variation is depicted in which a plurality of tension devices 80 are depicted mounted on a headstock 96 of a bass guitar 90, with each tension device 80 dedicated to providing tension to a corresponding musical string 30. One end of the string 30 is secured to a bridge supported on the body 92 of the guitar 90. The other end of the string 30 is attached to a corresponding one of the tension devices 80.

In the embodiments discussed above in connection with FIGS. 8-10 and 12, the spring sheets or leaves are rigidly connected to the mounts and carrier, and thus are considered a solid-state system in which the components are not movable relative one another. As such, there is little or no external friction. Also, even if the tension device is exposed to outside elements such as dirt and grime, such elements will not substantially affect spring function. It is to be understood that embodiments employing other types of springs, including coil springs, bar springs, etc., can be configured so that the springs are rigidly connected to the mounts and carrier.

Embodiments can function as, and be placed as, the bridge of a guitar or other stringed instrument. In other embodiments, constant-tension devices such as discussed herein can be placed on the headstock of a guitar (electric or acoustic), violin, cello or other stringed instrument, including acoustic versions of such instruments, thus keeping the components spaced from the body of the instrument. Of course, constant-tension devices can also be placed on or near the body of such instruments in some embodiments. Notably, suitable stringed instruments for incorporating tension devices as discussed herein also include pianos, mandolins, steel guitars, and others.

The "cent" is a logarithmic unit of measure used for musical intervals. More specifically, one cent is 1/100 of the difference in frequency from one note to the next in the 12-note chromatic scale. In this scale there are twelve notes in each octave, and each octave doubles the frequency so that 1200 cents doubles a frequency. As such, one cent is precisely equal to 2^(1/1200) times a given frequency. Since frequency is proportional to the square root of tension, one cent is also equal to a tension change by 2^((1/1200)*2)=2^(1/600) from one tension value to a tension value one cent away. 2^(1/600)−1=1/865 (0.001156). Thus, every change in tension by 1/865 (0.001156) equates to one cent different in frequency. Similarly, every change in tension by 1/86 (0.01156) equates to a ten cent difference in frequency, and every change in tension by 1/173 (0.00578) equates to a five cent difference in frequency.

In one embodiment, the operation range of a tension device configured to be used with a stringed musical instrument is selected to correspond to a change in frequency of ten cents or less per 1 mm of travel. In another embodiment, the operation range of tension device is selected to correspond to a change in frequency of five cents or less per 1 mm of travel. The actual length of the operation range can vary, but in some embodiments is up to about 1 mm of travel. In other embodiments, the operation range is up to about 1-1.5 mm of travel. In still further embodiments, the operation range is up to about 2 mm of travel.

With reference again to FIG. 6 and Table 3, in one embodiment the range of 10° from α=−5° to α=4° corresponds to a total distance of displacement of 0.175 inches and an average spring rate of 1.37 lb./in. Thus, the change in tension from one side of this range to the other is 0.24 lb., which is 0.24 lb./180 lb.=0.001332 change in tension, which corresponds to about 1.15 cents, which is well within the desired range, and is within a range that will not be aurally detectable by the human ear.

To determine a maximum desired change in tension to define a desired operational range of, for example, 10 cents, a string tension is multiplied by the value of 10 cents change in frequency. For example, for a guitar string designed for a tension of about 10 pounds, a change in tension corresponding to ten cents of frequency is calculated as 10 lb.*(01156) =0.12 lb.

Figure 13A:
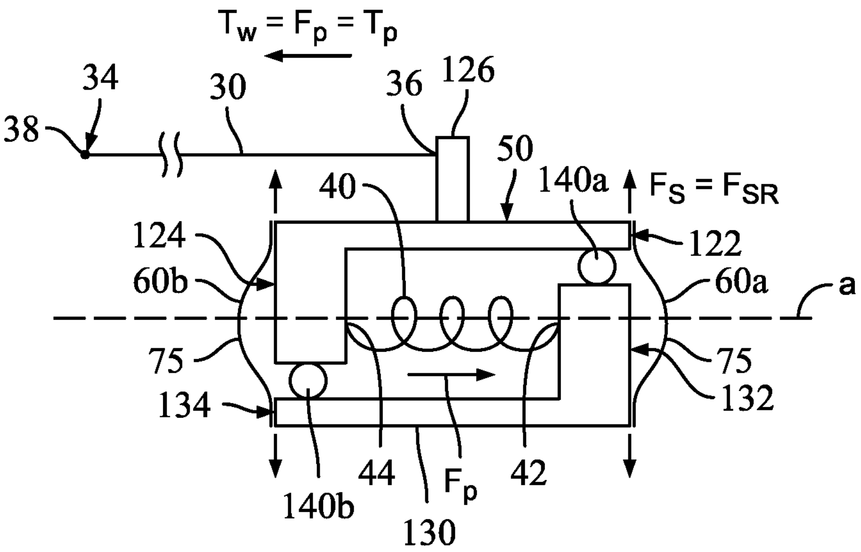
FIG. 13A is a schematic view of a spring-based string tensioner in accordance with yet another embodiment.
Figure 13B:
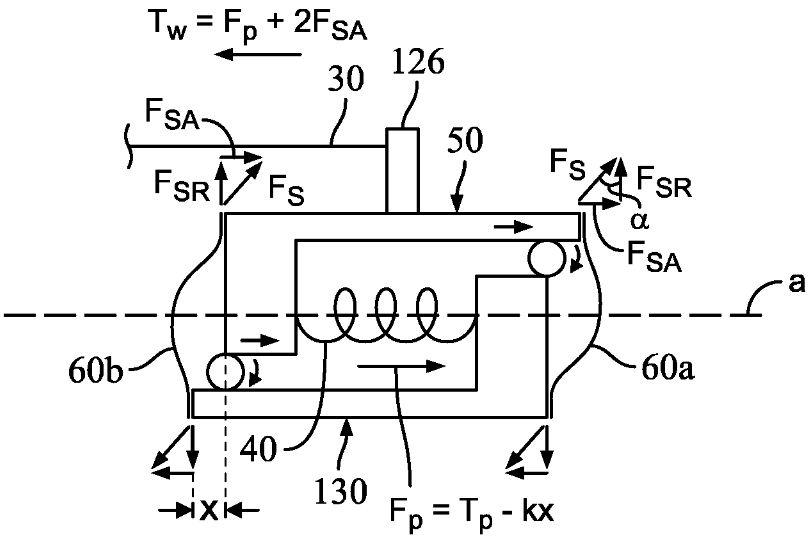
FIG. 13B shows the embodiment of FIG. 13B after a string attached thereto has expanded.

With reference next to FIGS. 13A and 13B, an embodiment of a spring-based tension device, or tensioner 120, is depicted schematically. In the illustrated embodiment, the tensioner 120 comprises a carrier 50 that moves longitudinally relative to a fixed base 130. The carrier 50 is elongated, and extends from a proximal end, or first end 122, to a distal end, or second end 124. A string support 126 is connected to and moves with the carrier 50. The string support 126 supports a wire or musical string 30 attached thereto, with the moveable end 36 of the string 30 attached to the string support 126. A fixed end 34 of the string 30 is attached to a fixed mount 38, such as a guitar's tuning pegs. The base 130 is also elongated, and extends from a first end 132 to a second end 134. In the illustrated embodiment, first and second roller bearings 140*a*, 140*b* are disposed between the carrier 50 and the base 130. Both the carrier 50 and base 130 are elongated along a longitudinal axis a. A first direction is defined parallel to the longitudinal axis a and extending from the second end 124 toward the first end 122. A second direction opposite the first direction is parallel to the longitudinal axis a and extending from the first end 122 toward the second end 124. The first direction is a proximal direction, and a proximal side of a structure is the side of the structure most toward the first end; the second direction is a distal direction, and a distal side of the structure is the side of the structure most toward the second end.

A primary spring 40 extends longitudinally between the carrier 50 and base 130 so as to exert a longitudinally-directed primary spring force Fp between the two. The fixed end 42 of the primary spring 40 is attached to the base 130, and the moveable end 44 of the primary spring 40 is attached to the carrier 50 so that as the carrier 50 moves longitudinally relative to the base 130, the length of the primary spring 40 changes.

A first secondary spring 60*a* is attached to and extends between first ends 122, 132 of the carrier 50 and base 130. A second secondary spring 60*b* is attached to and extends between second ends 124, 134 of the carrier 50 and base 130. Each of the secondary springs 60*a*, 60*b* comprise a flat spring sheet 75 that is deflected so as to bow outwardly as shown when the carrier 50 and base 130 are assembled together to form the tensioner 120. For sake of simplicity, structure for holding the carrier 50 and base 130 into simultaneous and secure contact with the bearings 140*a, b* in opposition to the normally-directed forces exerted by the secondary springs 60*a, b* are not depicted in the schematic views of FIGS. 13A and 13B.

In the arrangement shown in FIG. 13A, the first and second ends 122, 124 of the carrier 50 are aligned with the first and second ends 132, 134 of the base 130. As such, the force Fs exerted by the secondary springs 60*a*, 60*b* is directed normally relative to the longitudinal axis a of the tensioner 120. Specifically, the secondary force Fs comprises only a radially-directed vector force Fsr, or Fs=Fsr. There is no axially-directed vector force Fsa (i.e., Fsa=0). In this arrangement the primary spring force Fp is the only longitudinally, or axially, directed force exerted on the carrier 50, which force is communicated to the wire or spring 30 so that a tension in the spring Tw=Fp. As discussed above, each musical string 30 has a preferred tension Tp. Thus, at the configuration shown in FIG. 13A, if Fp=Tp, then Tw=Fp=Tp, and the string 30 is held in the preferred tension. Notably, tensioners 120 having principles as discussed can be used in place of tension devices 80 discussed above.

As also discussed above, for various reasons a string 30 may contract or expand in length, causing the carrier 50 to translate to compensate. FIG. 13B depicts an arrangement in which the string 30 has expanded in length a distance x relative to the position in FIG. 13A. As such, the bearings 140*a*, 140*b* have rolled in the first direction over the respective surfaces of the carrier 50 and base 130, and the primary spring 40 has decreased in length by the distance x. The force Fp exerted by the primary spring has thus decreased, now being Fp=Tp-kx, where k is the primary spring's spring constant. At the same time, however, the secondary springs 60*a*, 60*b* are deflected so that the secondary spring forces Fs are directed at a non-normal angle α relative to the longitudinal axis a. As such, each secondary spring force Fs comprises an axially-directed vector force Fsa that can be calculated as Fssinα. The total tension applied to the string Tw thus is the combination of the primary spring force Fp and the two axially-directed vector forces Fsa of the secondary springs 60*a*, 60*b*, such that Tw=Fp+2Fsa, or Tw=Tp−kx+2Fsa. As in embodiments discussed above, preferably the tensioner 120 is configured so that, within its operating range, sinα is generally linear. Also, preferably the spring sheets 75 of the secondary springs 60*a*, 60*b* are selected so that the axially-directed vector force Fsa over the operating range generally follows the relationship 2Fsa is about equal in magnitude to kx. Thus, Tw will stay about the same as Tp over the operating range of the tensioner 120, as the increase in axially-directed force contributed by the secondary springs 60*a*, 60*b* compensates for the loss of axially-directed force from the primary spring 40. In any case, preferably the secondary springs 60*a*, 60*b* are selected so that, over the operating range, Tw stays close enough to Tp so that there is minimal or no aurally-detectable change in sound as the string 30 vibrates.

With reference next to FIG. 14, an embodiment of a modular string holder assembly 100 comprises a plurality of tensioners 120 (or modules), each of which employ the operative principles discussed above in connection with FIGS. 13A and 13B. The illustrated modular string holder assembly 100 employs four tensioners 120, each configured to hold one musical string 30, and thus providing four musical strings 30 for an instrument such as a bass guitar. The tensioners 120 are each independently attached to a mount plate 150 (see FIG. 15), which extends from a proximal end, or first end 152, to a distal end, or second end 154, and comprises a plurality of mount apertures 156 configured to receive fasteners so that the mount plate 150 can be secured to a surface such as the body 92 of a guitar 90. A plurality of retainers 158 extend upwardly from the flat top surface of the mount plate 150 and are configured to releasably hold the tensioners 120 in place as will be discussed in more detail below. The illustrated retainers 158 are generally hook-shaped, opening toward the first end 152.

With additional reference next to FIGS. 16-20, the elongated base 130 comprises a base body 160 having a flat bottom surface configured to rest on the top surface of the mount plate 150. A base spring mount 162 extends upwardly from the base body 160 adjacent to the second end 134. A tuning rod receiver 164 is supported by the base spring mount 162 and is tubular in a longitudinal direction. A tuning rod 166 comprises an elongated threaded shaft 168 and a tuning head 170. The shaft 168 extends through the tuning rod receiver 164 so that the tuning head 170 abuts the proximal end of the receiver 164.

Figure 17:
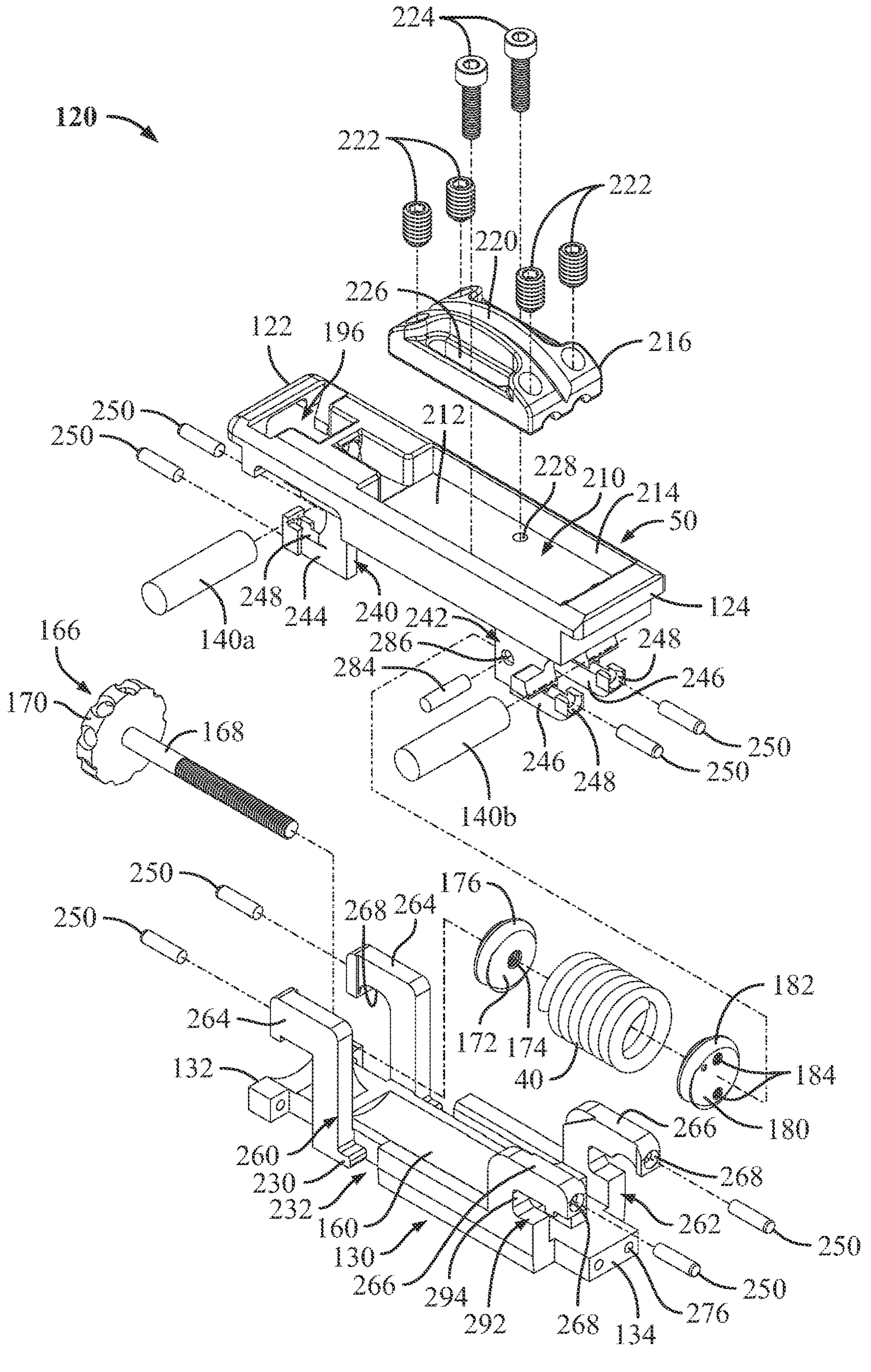
FIG. 17 is an exploded view of the string tensioner of FIG. 16.

With particular reference to FIGS. 17 and 20, a first spring holder 172 has a central threaded aperture 174 configured to be threaded over the shaft 168, and outer spring threads 176 configured to receive coils of the primary spring 40 so as to hold a proximal end of the spring 40. A second spring holder 180 also comprises outer spring threads 182 configured to receive coils of the primary spring 40 so as to hold a distal end of the spring 40.

Figure 18:
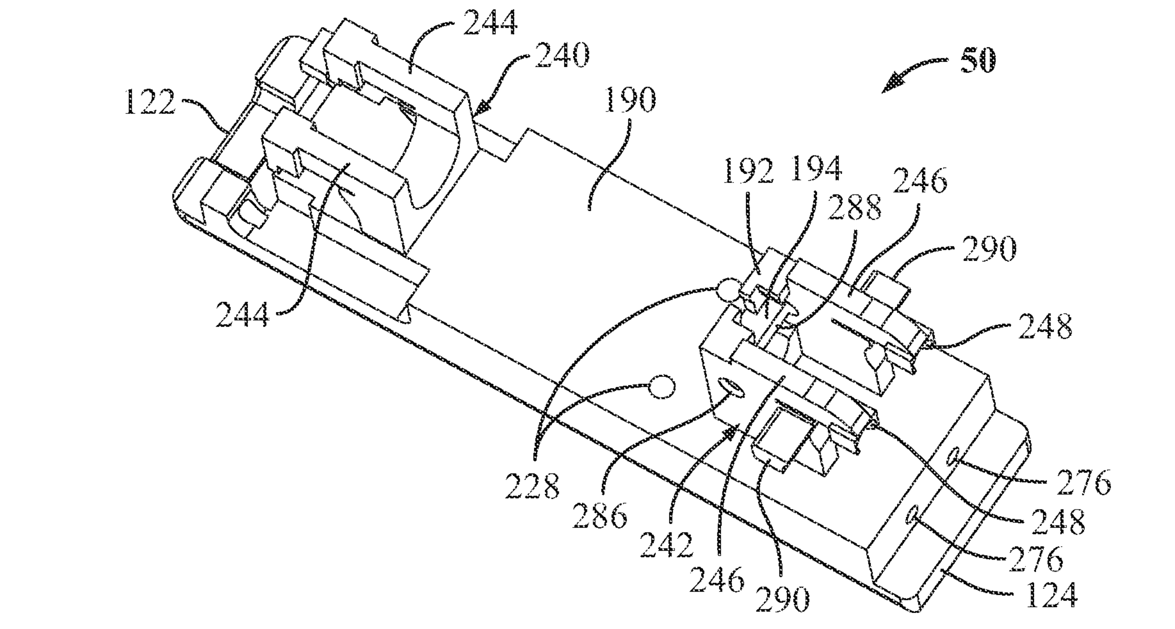
FIG. 18 is a bottom perspective view of a carrier portion of the string tensioner of FIG. 16.
Figure 19:
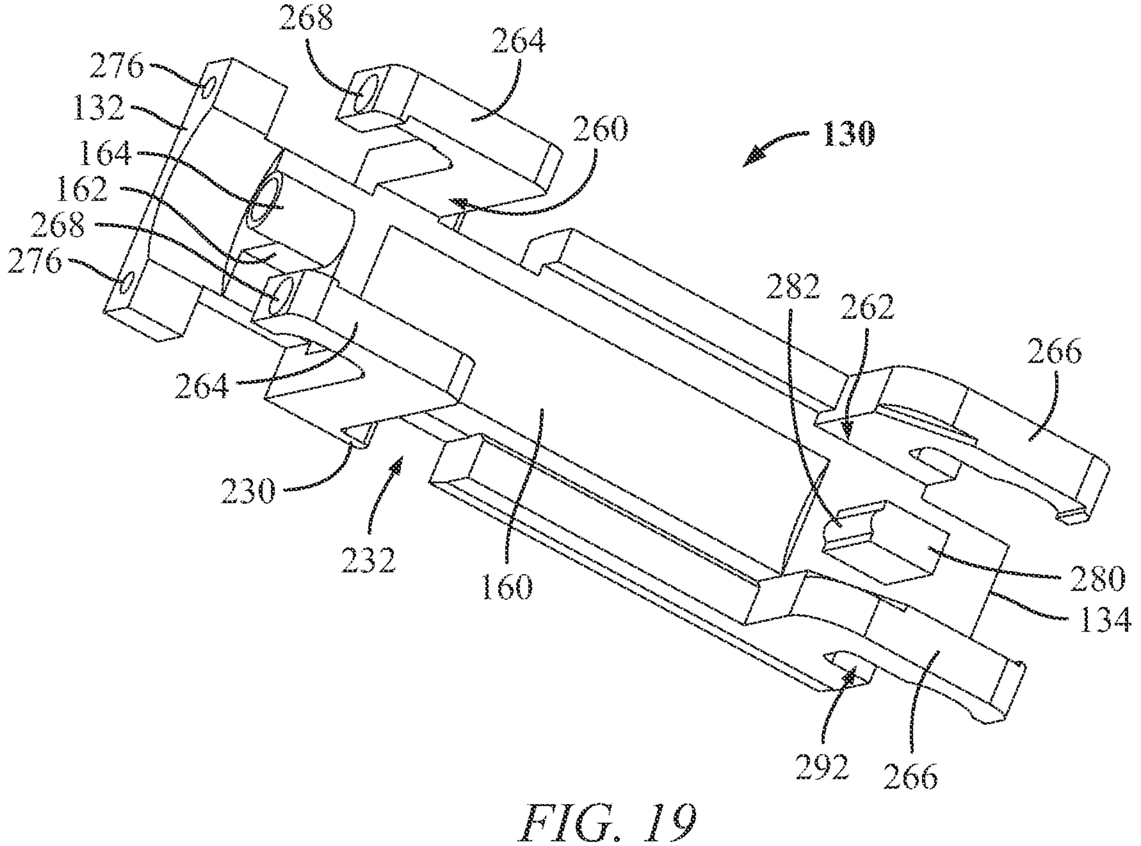
FIG. 19 is a top perspective view of a base portion of the string tensioner of FIG. 16.

With reference to FIGS. 17, 18 and 20, the carrier 50 comprises a carrier body 190 from which a carrier spring mount 192 (see FIG. 18) depends. The second spring holder 180 can be attached to the carrier spring mount 192. In the illustrated embodiment, the second spring holder 180 includes threaded holes 184 (see FIG. 17) configured to receive bolts 186 (see FIG. 20) that engage nuts 188. As best shown in FIG. 20, the carrier spring mount 192 can include nut receivers 194 disposed on a distal side of the carrier spring mount 192 and configured to receive the nuts 188. The bolts 186 extend through the carrier spring mount 192 and are threaded into the nuts 188 so as to attach the second spring holder 180 to the carrier spring mount 192. At the same time, the shaft 168 of the tuning rod 166 extends through the tuning rod receiver 164 so that the tuning head 170 abuts the proximal end of the receiver 164 in addition to connecting to the first spring holder 172. As such, the primary spring 40 is attached between the carrier 50 and base 130.

Continuing with reference to FIG. 20, rotation of the tuning knob 166 causes the first spring holder 172 to translate longitudinally relative to the second spring holder 180, and thus will correspondingly increase or decrease the tension in the primary spring 40. As such, the tuning knob 166 enables a user to increase or decrease the tension applied to a corresponding musical string 30. In the illustrated embodiment, access to the tuning head 170 can be had through a tuning access space 196 formed through the body 190 of the carrier 50 (see FIGS. 16-18 and 20). Specifically, a tool configured to engage the tuning head 170 of the tuning knob 166 can be advanced through the tuning access space 196 so as to engage the tuning head 170 and facilitate rotation of the tuning knob 166, thus adjusting tension and positioning of the primary spring 40.

Continuing with reference to FIGS. 14-20, a string mount 200 is formed on the carrier 50. In the illustrated embodiment, the string mount comprises a ball wall 202 that has a string guide aperture 204 formed therethrough. A ball receiver 206 is formed on a proximal side of the ball wall 202. A musical string 30 can be drawn through the string guide 204 until a string ball 208 of the string 30 engages the ball wall 202 so that the string ball 208 of the string 30 is retained in the ball receiver space 206.

As best shown in FIGS. 17 and 20, a race 210 can be formed in a top surface of the carrier 50. The illustrated race 210 is elongated, having a race surface 212 and race side walls 214. A string support 216 is received in the race 210 and is movable longitudinally within the race 210. The illustrated string support 216 includes an arcuate saddle 220 configured to receive the musical string 30. In this embodiment, the saddle 220 of the string support 216 effectively functions as a bridge for the corresponding string 30. A plurality of threaded height screws 222 extend through the string support 216 and engage the race surface 212. Rotation of the height screws 222 can adjust the height of the string support 216, and thus the height of the associated string 30 relative to the body of the musical instrument. A pair of threaded fasteners 224 extend through elongated slots 226 formed in the string support 216 and into receivers 228 formed through the race surface 212. When tightened, the fasteners 224 hold the string support 216 in place at the height proscribed by the height screws 222.

Accomplished guitarists typically wish to adjust the length of each guitar string 30 in order to attain proper tuning. Such length adjustment, known as intonation, typically involves independent positioning of each bridge member to set the desired length for the corresponding guitar string. With continued reference to FIGS. 17 and 20, when the fasteners 224 are not fully tightened, the string support 216 can move longitudinally within the race 210, allowing adjustment of intonation. Once the desired intonation location of the string support 216 is reached, the fasteners 224 can be tightened, securing the string support 216 in place longitudinally within the race 210.

It is to be understood that, in additional embodiments, other types and configurations of a bridge or string holder can be employed, and such structures can be incorporated into the tensioner 120 as shown or be independent of the tensioner. Also, various structures for engaging and holding the string ball can also be employed.

Figure 15:
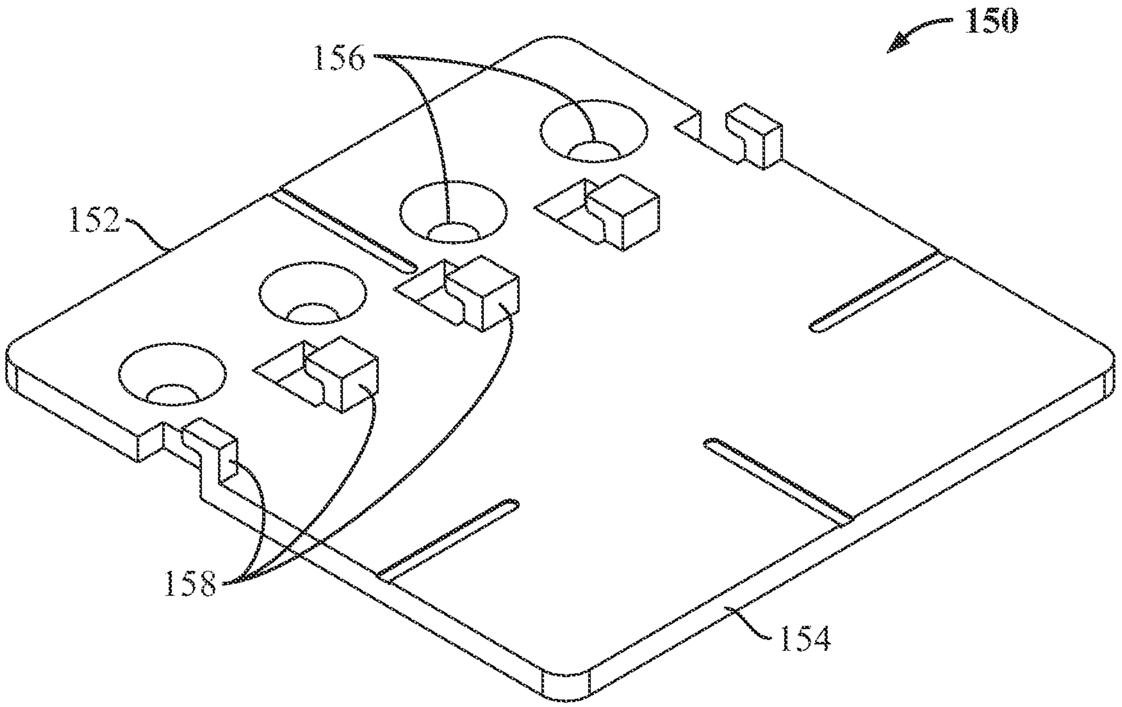
FIG. 15 is a perspective view of a mount plate of the modular string holder assembly of FIG. 14.
Figure 16:
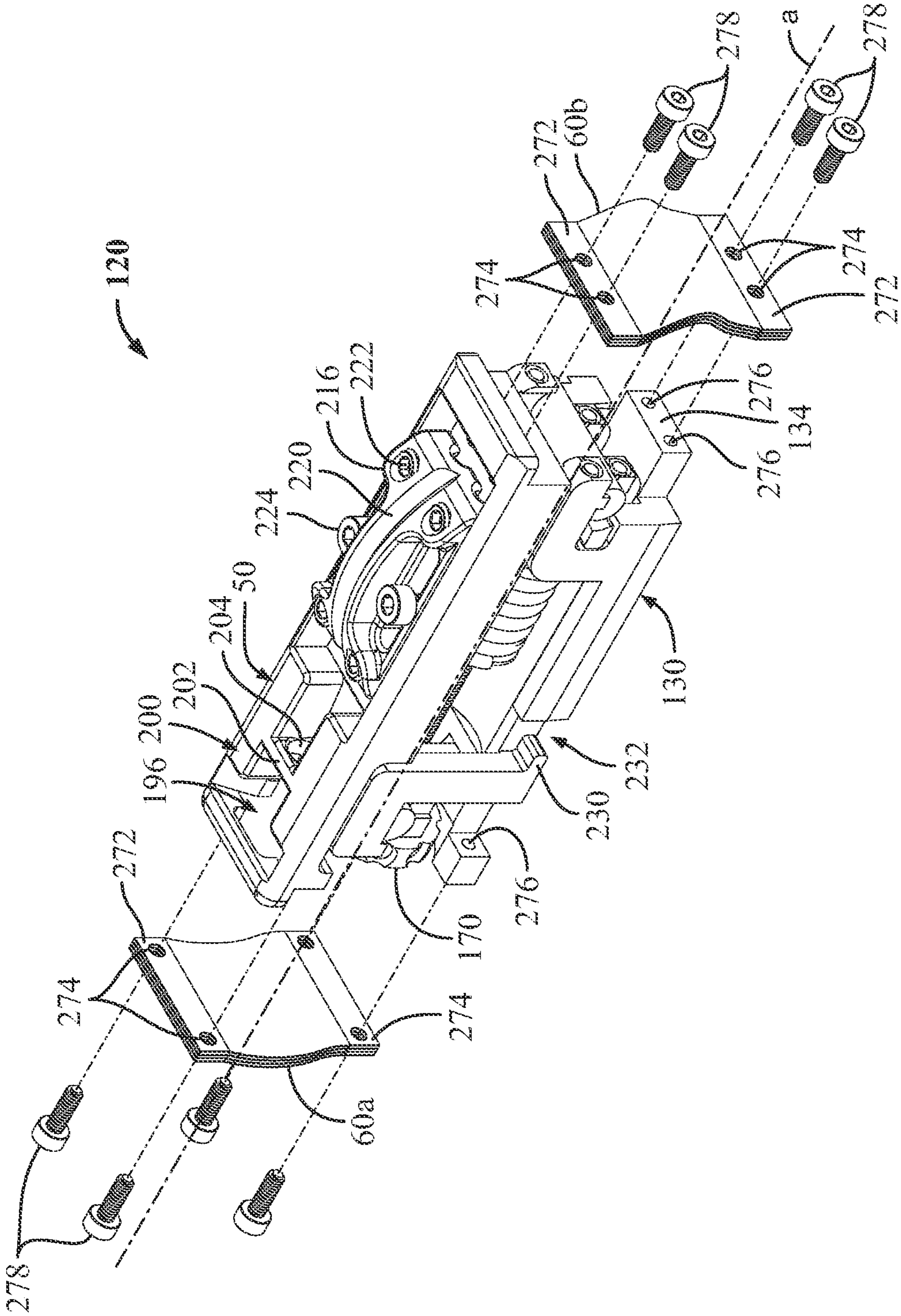
FIG. 16 shows a perspective view of a string tensioner from the arrangement of FIG. 14, shown partially exploded.

With reference next to FIGS. 16 and 17, the base 130 has a catch 230 formed on each opposing side. Each catch 230 has a distally-extending portion. A retainer space 232 is located distally of the catch 230. With additional reference to FIGS. 14 and 15, the retainer space 232 is sized and configured so that a retainer 158 of the mount plate 150 can extend through the retainer space 232. The tensioner 120 can then be slid distally to engage the catch 230 with the retainer 158 in a manner so that the base 130 is prevented from moving distally or upwardly relative to the mount plate 150. As shown in FIG. 15, some of the retainers 158 are sufficiently wide as to accommodate the catches 230 of two adjacent bases 130.

With continued reference to FIGS. 14-17, the catches 230 preferably are located proximal of a longitudinal midpoint of the base 130. Similarly, the retainers 158 are located proximal of a longitudinal midpoint of the mount plate 150. Also, the mount apertures 156 are located proximal of a longitudinal midpoint of the mount plate 150, and in the illustrated embodiment proximal of the retainer 158. In use, when a tensioner 120 is installed on the mount plate 150, tension in the string 30 will tend to pull the tensioner 120 distally, and since the string mount 200 is spaced from the catch 230, a lever arm effect would tend to rotate the tensioner 120. Since the catch 230 and retainer 158 are configured to also block upward movement of the base 130, upward rotation of the proximal portion of the tensioner 120 is restrained. The distal portion of the mount plate 150 restrains downward rotation of the second end 134 of the base 130.

With reference next to FIGS. 17 and 18, first and second carrier support members 240, 242 depend from the carrier body 190. The first carrier support member 240 has a pair of first carrier arms 244 that extend proximally—in the axial first direction. The second carrier support member 242 has a pair of second carrier arms 246 that extend distally—in the axial second direction. The carrier spring mount 192 can be incorporated as part of the second carrier support member 242. Each of the first and second carrier arms 244, 246 defines a rod receiver 248 configured to receive and hold an elongated support rod 250 so that, along an operating length of the support rod 250, a top portion of the support rod 250 is exposed.

First and second base support members 260, 262 extend upwardly from the base body 160. The first base support member 260 has a pair of first base arms 264 that extend proximally—in the axial first direction. The second base support member 262 has a pair of second base arms 266 that extend distally—in the axial second direction. Each of the first and second base arms 264, 266 defines a rod receiver 268 configured to receive and hold a support rod 250 so that, along an operating length of the support rod 250, a bottom portion of the support rod 250 is exposed.

To assemble the tensioner 120, the carrier 50 and base 130 are arranged so that the carrier body 190 is vertically above the base body 160. The carrier body 190 can then be lowered relative to—or brought closer to—the base body 160 so that the base arms 264, 266 are vertically above the carrier arms 244, 246. A first bearing 140*a* which, in the illustrated embodiment, is cylindrical in shape, is placed between the first base arms 264 and first carrier arms 244. A second bearing 140*b* which, in the illustrated embodiment, is also cylindrical in shape, is placed between the second base arms 266 and second carrier arms 264 so that the bearings 140*a, b* are generally above the carrier arms 244, 246, respectively, as shown in FIG. 20. In this manner, if the carrier body 190 and base body 160 were to be pulled apart, the first bearing 140*a* between the first carrier arms 244 and first base arms 264 and the second bearing 140*b* between the second carrier arms 246 and second base arms 266 will block the carrier body 190 and base body 160 from being pulled apart.

As noted above, in the illustrated embodiment the secondary springs 60*a*, 60*b* comprise flat spring sheets 75 formed of a toughened spring steel, which spring sheets 75 are biased to a flat state when at rest. A secondary axis of each spring sheet 75 runs between the opposing mount ends 272. As best shown in FIGS. 16 and 20, in the illustrated embodiment the secondary springs 60*a*, 60*b* each comprise a plurality (here, four) of flat spring sheets 75 stacked adjacent to one another with spacers 270 therebetween at opposing mount ends 272 of the spring sheets 75. A pair of spaced-apart mount holes 274 are formed in each mount end 272 and align with threaded receiver holes 276 formed in the respective ends of the carrier 50 and base 130. Secondary fasteners 278 extend through the mount holes 274 and are threaded into the receiver holes 276 in order to secure the secondary springs 60*a*, 60*b* to the carrier 50 and base 130.

During assembly of the tensioner 120, the secondary springs 60*a*, 60*b* can be attached to the carrier 50 and base 130 with the spring sheets 75 of the secondary springs 60*a*, 60*b* in a substantially flat, at rest position. The at-rest springs 60*a*, 60*b* can have their mount holes 274 aligned with threaded receiver holes 276 and secured in place with the secondary fasteners 278 (see FIG. 16). Once the springs 60*a*, 60*b* are attached, a clamping force can be applied to urge the carrier body 190 toward the base body 160 sufficient so that the bearings 140*a*, 140*b* can be placed between respective first and second carrier arms 244, 246 and base arms 264, 266 as discussed above. The operation of moving the carrier body 190 toward the base body 160 will compress the secondary springs 60*a*, 60*b* along their secondary axes, resulting in the outwardly-deflected compressed shape shown in the drawings. In this arrangement, the secondary springs 60*a*, 60*b* express a secondary spring force Fs tending to return the spring sheets 75 to their flat at-rest configurations. This secondary spring force Fs is directed transverse to the axially-directed primary spring force Fp (see FIGS. 13A, 13B).

When installed on the tensioner 120, the compressed secondary springs 60*a*, 60*b* tend to urge the carrier 50 upwardly relative to the base 130. As such, and as shown in FIG. 20, the carrier support arms 244, 246 are urged upwardly toward the base support arms 264, 266. As a result, the bearings 140*a*, 140*b* are tightly sandwiched between opposing support arms so that the cylindrical bearings 140*a*, 140*b* are engaged with support rods 250 both above and below the bearings 140*a*, 140*b*. The bearings 140*a*, 140*b* constrain the carrier 50 from moving vertically relative to the base 130, and the transverse (to the axis a) component of the secondary spring force Fs keep the bearings 140*a*, 140*b* in continuous contact with the support rods 250. As such, the vertical position of the carrier 50 relative to the base 130 is continuously maintained.

As just noted, the bearings 140*a*, 140*b* simultaneously engage the exposed upper and lower portions of the adjacent support rods 25. As such, when the carrier 50 moves longitudinally relative to the base 130, the bearings 140*a*, 140*b* roll over the engaged support rods 250 substantially without friction. Preferably, the bearings 140*a*, 140*b* and support rods 250 are formed of a precision-milled hardened steel so as to minimize frictional losses when rolling under applied loads. With additional reference to FIGS. 18 and 19, preferably a transverse space between the first base support arms 264 is at least slightly greater than a distance between side surfaces of the first carrier support arms 244 and a transverse space between the second base support arms 266 is at least slightly greater than a distance between side surfaces of the second carrier support arms 246. As such, the various support arms 244, 246, 264, 266 do not interfere with one another when the carrier 50 moves longitudinally relative to the base 130.

The illustrated flat spring sheets 75 are generally rectangular in their at-rest shape, and as discussed above, the mount holes 274 in the mount ends 272 are spaced apart. As such, when both mount ends 272 of a secondary spring 60*a*, 60*b* are attached to and between the carrier 50 and base 130, the secondary spring 60*a*, 60*b* will resist both transverse side-to-side and rotational movement of the carrier 50 relative to the base 130.

With vertical, side-to-side, and rotational movement of the carrier 50 relative to the base 130 constrained, only longitudinal movement of the carrier 50 relative to the base 130 along or parallel to the axis a is enabled in the tensioners 120. Also, preferably the carrier 50 and base 130 are kept out of direct contact with one another. In this arrangement, the tensioner 120 described in connection with FIGS. 14-20 will operate in a manner consistent with the embodiment illustrated schematically in FIGS. 13A and 13B, in that the secondary springs 60*a*, 60*b* will apply an axially-directed vector force Fsa that will be added to the primary force Fp generated by the primary spring 40 to apply a tension Tw on the string 30, which axially-directed vector force Fsa varies as the carrier 50 moves longitudinally relative to the base 130.

With reference next to FIGS. 16-20, a bend stop 280 extends upwardly from the base body 160 near the second end 134. Preferably, the bend stop 280 is disposed along a center axis of the base 130 and directly in the longitudinal path of the carrier spring mount 192. As shown, an arcuate stop protrusion 282 is formed at a proximal end of the bend stop 280. A cylindrical stop pin 284 is supported by the second carrier support member 242, which has a pair of opposing stop pin apertures 286 through which the stop pin 284 extends. In the illustrated embodiment the carrier spring mount 192 includes a stop pin support 288 which is configured with an arcuate cradle to complementarily hold the stop pin 284 to prevent or limit proximal deflection of the stop pin 284 upon application of a proximally-directed force. The tensioner 120 is configured so that as the carrier 50 moves distally relative to the base 130 the stop pin 284 moves closer to, and eventually contacts, the protrusion 282 of the bend stop 280, preventing the carrier 50 from moving further distally.

In some guitar-based embodiments a user may adjust the spring 40 via the tuning knob 166 so that the stop pin 284 is immediately adjacent the stop protrusion 282. As such, if the user desires to "bend" notes during play, and thus pulls or pushes a string 30 (resulting in the carrier 50 being pulled distally over the base 130), the stop pin 284 will engage the stop protrusion 282 to block such relative movement. The tensioner 120 will thus be stopped (temporarily) from maintaining the string tension at or near Tp, and the user will be able to increase the tension in the string, resulting in a "bent" note.

With specific reference next to FIGS. 16-19, backstops 290 extend laterally from each side surface of the second carrier support member 242. Backstop receivers 292 are formed within the second base support member 262, and both terminate at a proximal backstop wall 294. As the carrier 50 moves proximally relative to the base 130, eventually the backstops 290 will engage the backstop walls 294 so that further proximal translation of the carrier 50 relative to the base 130 is prevented. As such, the longitudinal operational range of the carrier 50 extends from the point at which the backstops 290 engage the backstop walls 294 to the point at which the stop pin 284 engages the bend stop 280.

In the embodiment illustrated in FIGS. 16-19, the backstops 290 extend laterally from each side surface of the second carrier support member 242. In another embodiment, a backstop can be defined centrally extending transversely across the second carrier support member—or can extend independently from the carrier body so that when the carrier 50 moves longitudinally and proximally relative to the base 130, eventually the backstop will engage the distal side of the bend stop280. As such, the longitudinal operational range of the carrier 50 can extend from the point at which the backstop engages distal side of the bend stop 280 to the point at which the stop pin 284 engages the proximal side of the bend stop 280.

In some configurations the string tensioner 120 can be expected to withstand substantial forces, and the carrier 50 and base 130 are made of a strong, durable material such as steel and/or aluminum. In a preferred embodiment the stop pin 284 can be made of a different material, such as a plastic, in order to minimize the likelihood of buzzing when the stop pin 284 approaches and engages the bend stop 280. Also, the arcuate nature of the stop protrusion 282 and stop pin 284 is such as to concentrate contact therebetween at a very small contact patch, further reducing the risk of buzzing. This is especially true as the stop pin 284 and stop protrusion 282 are arcuate about axes that are transverse, even normal, to one another. Additionally, it should be noted that in the illustrated embodiment the bend stop 280 is arranged and supported in the base 130 so that the protrusion 282 is centered between opposing sides of the base 130. Thus, the stop pin 284 engages the stop protrusion 282 in a manner in which the carrier 50 remains balanced, and twisting of the carrier 50 is minimized or avoided altogether.

It is to be understood that, in additional embodiments, different specific structures and shapes can be employed for bend stop structures and backstop structures. It is also to be understood that, in some embodiments, available materials and force requirements can be such that structures such as the stop pin can be incorporated unitarily into the carrier. Still further embodiments may replace the illustrated stop pin and associated structure with different specific structures of stop members for engaging various specific structures of bend stops. Further, depending on the application, certain structures of the tensioner currently formed of metals can be made of lighter and/or less expensive materials such as certain plastics.

Tuning access space 196 may be the only way to access the tuning head 170 when the tensioner 120 is mounted onto the mount plate 150 with other tensioners 120 as depicted in FIG. 14. However, prior to mounting the tensioner 120 onto the mount plate 150, and prior to installing a string 30, the tuning head 170 may be easily accessible from the side of the tensioner 120. Thus, during manufacturing, or at least prior to attaching the tensioner 120 to the plate 150, the tuning head 170 can be actuated sufficiently to tighten the primary spring 40 to a tension approximating a desired final tension of the corresponding string 30. Such pre-tensioning will make later tuning easier, as less adjustments through the relatively narrow tuning access space 196 will be needed.

The primary spring 40 is selected to have a spring rate configured to work with the spring rates of the secondary springs 60*a*, 60*b* to achieve the desired effect as discussed above. However, it is to be understood that there may be variations from coil spring to coil spring due to manufacturing variances. The coil spring used as the primary spring 40 preferably has a spring rate within a defined range so as to work as desired with the secondary springs. During manufacturing/assembly, the primary spring 40 may be tested to ensure that its spring rate falls within the defined range. If not, the first spring holder 172 can be rotated so as to change the effective length of the primary spring 40, and thus correspondingly change its spring rate. The spring rate of the primary spring 40 can then be tested again and, as necessary, further adjustments can iteratively be made until the primary spring 40 measured spring rate falls within the defined range.

Figure 21:
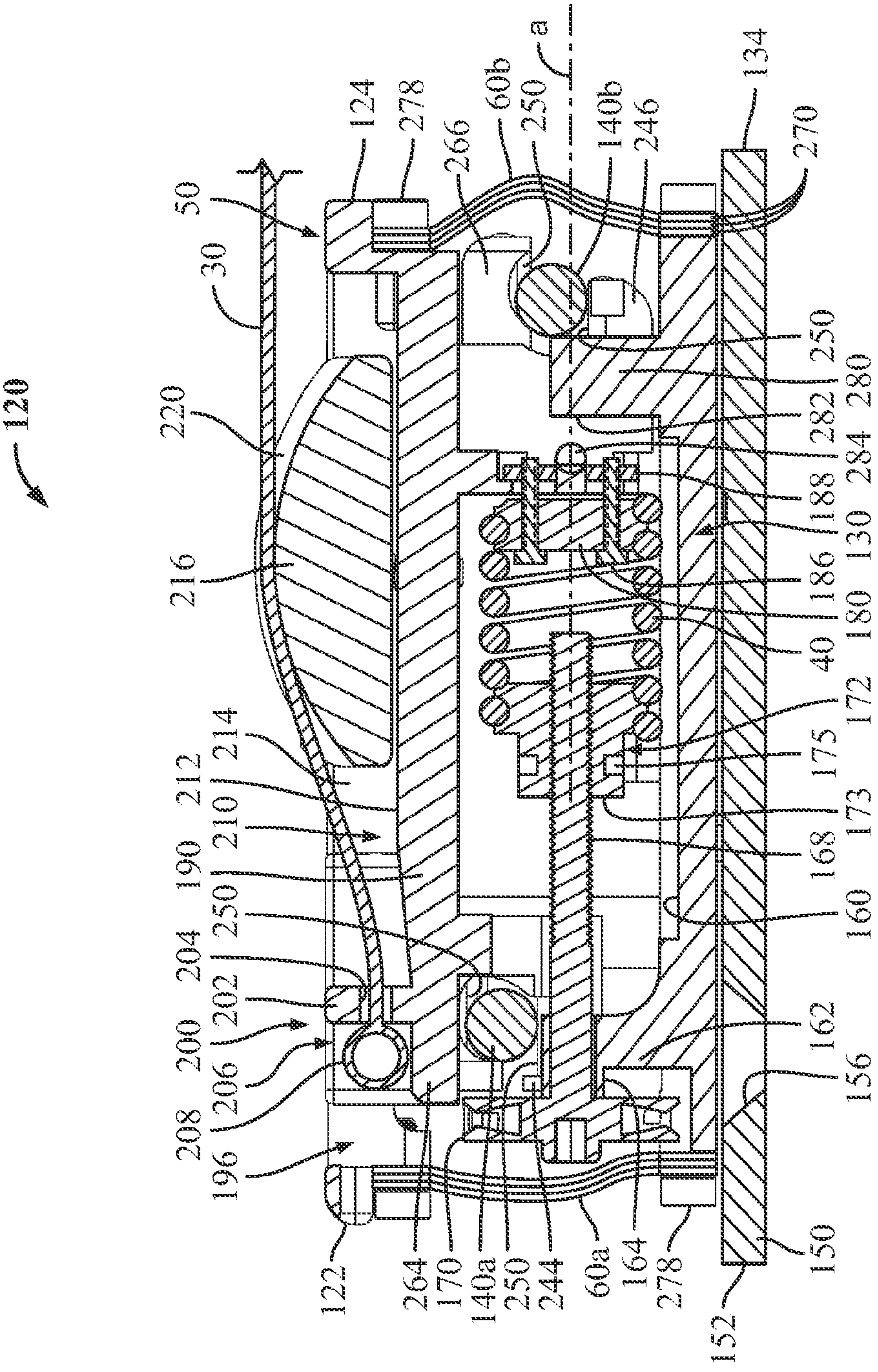
FIG. 21 is a cross-sectional view of a variation.

With reference next to FIG. 21, a variation is illustrated in which the first spring holder 172 has a proximally-extending adjustment portion 173 configured to enable a user or assembler to gain purchase to facilitate rotation of the first spring holder 172 so as to adjust the effective length of the primary spring 40 as discussed above. The adjustment portion 173 can be configured to be accessible and turnable by a finger. It can also be configured with a plurality of apertures 175 configured to receive the end of a tool, such as an allen key, to facilitate rotation of the first spring holder 172 relative to the primary spring 40 so as to adjust the effective length of the primary spring 40.

Figure 22A:
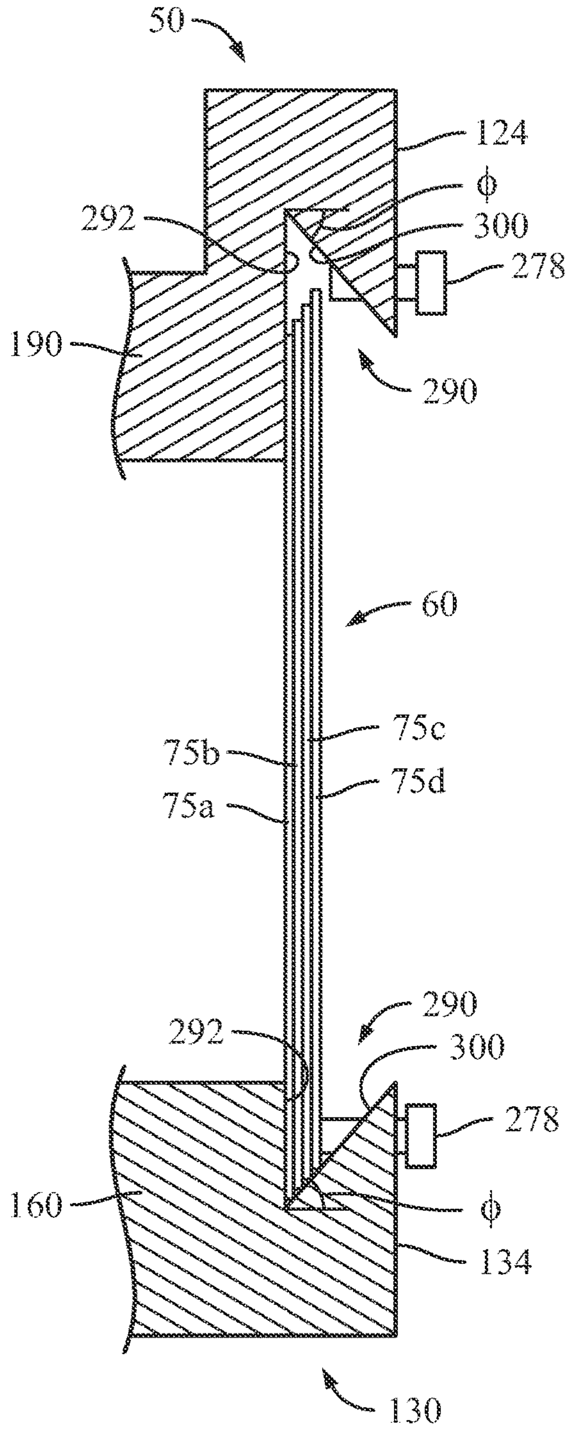
FIG. 22A is a partial side cross-sectional view of a distal end of another tensioner embodiment during assembly.
Figure 22B:
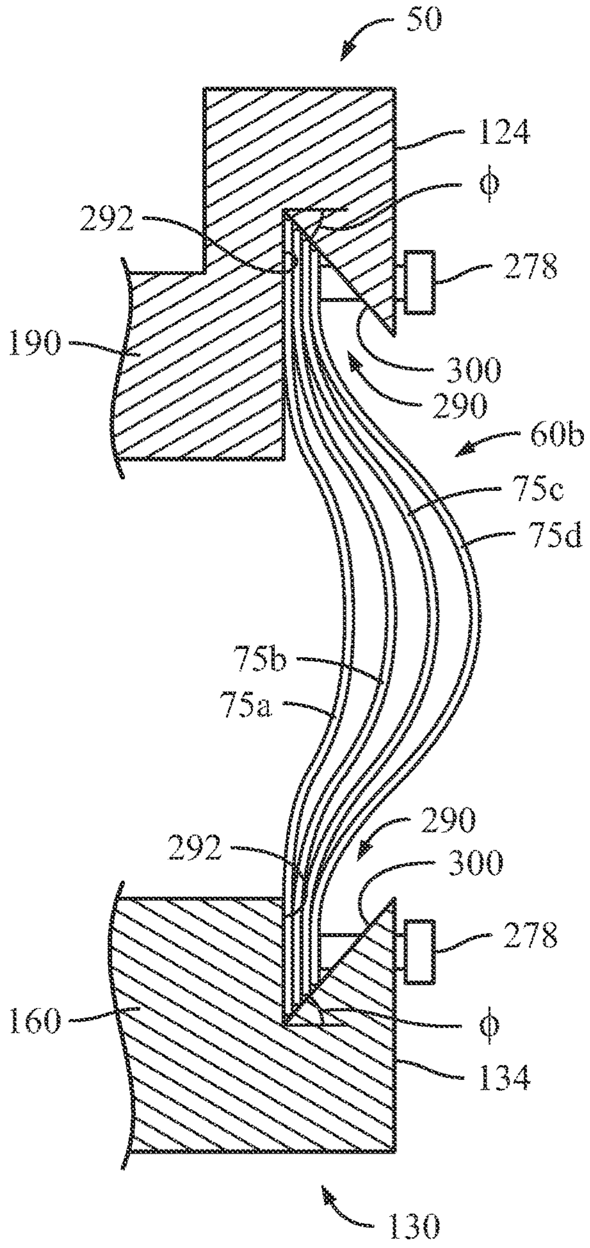
FIG. 22B shows the arrangement of FIG. 22A when assembled.

With reference next to FIGS. 22A and 22B, in another embodiment of a tensioner 120 the spring sheets 75*a*-75*d* of the secondary springs 60*a*, 60*b* can be placed without employing spacers therebetween. In the illustrated embodiment each secondary spring 60*a*, 60*b* is comprised of four substantially identical spring sheets 75*a*-75*d*. A spring mount structure 290 is formed adjacent the second end 134 of the base body 160. The spring mount structure 290 comprises a backing surface 292 which, in the illustrated embodiment, is flat and substantially perpendicular to the axis a. A deflection surface 300 extends from the backing surface 292 toward the second end 134. The deflection surface 300 extends at an angle @ relative to a line parallel to the axis a.

Prior to attaching the carrier 50 and base 130, a stack of identical spring sheets 75*a*-75*d* is placed in the spring mount structure 290 so that a first spring sheet 75*a* abuts and rests against the backing surface 292, and an end of each spring sheet 75*a*-75*d* engages the deflection surface 300 as depicted in FIG. 22A. As such, and as shown, due to its angled orientation, each spring sheet end engages the deflection surface 300 at a location slightly vertically (relative to the page) higher than the end of the previous spring sheet 75. A secondary fastener 278 can be tightened so as to tightly sandwich the spring sheets 75*a*-75*d* between the secondary fastener 278 and the backing surface 292 while the ends engage the deflection surface 300.

Continuing with reference to FIG. 22A, a spring mount structure 290 is also provided on the carrier body 190 adjacent the second end 124. This spring mount structure 290 is essentially a mirror image (about the axis a) of the spring mount structure 290 of the base body 160, having a flat backing surface 292 and a deflection surface 300 that extends from the backing surface 292 toward the second end 124. The deflection surface 300 extends at an angle relative to a line parallel to the axis a.

Preferably, when the carrier body 190 and base body 160 are to be assembled, the flat sheets 75*a*-75*b* are first attached to the spring mount structure 290 of the base body 160, and the carrier body 190 and base body 160 are aligned so that the first flat sheet 75*a* rests upon the backing surfaces 292 of both the base body 160 and carrier body 190, as depicted in FIG. 22A. The carrier body 190 can then be advanced toward the base body 160, as discussed above, during which operation the ends of the spring sheets 75*a*-75*d* will engage the deflection surface 300 of the carrier body 190, compressing the spring sheets 75 and causing them to deflect outwardly as depicted in FIG. 22B. A secondary fastener 278 can be tightened so as to tightly sandwich the spring sheets 75*a*-75*d* between the secondary fastener 278 and the backing surface 292 while the ends engage the deflection surface 300. Since the ends of each spring sheet 75*a*-75*d* engage the deflection surfaces 300 at staggered locations, each spring sheet 75*a*-75*d* is compressed—and thus deflects—to a different extent, with the first spring sheet 75*a* be compressed—and deflecting—the least while the fourth, outermost spring sheet 75*d* is compressed—and deflects—the most. As such, even though there are no spacers between adjacent spring sheets 75*a*-75*d*, their compressed portions are spaced from one another and can move substantially unimpeded by one another during operation of the tensioner 120 when the carrier 50 moves longitudinally relative to the base 130.

FIGS. 22A and 22B depict structure associated with the second secondary spring 60*b*. It is anticipated that similar structure involving spring mount structures 292 can be employed adjacent first ends 122, 132 of the carrier body 190 and base body 160 so as to hold the first secondary spring 60*a*. The spring sheets 75 and angle @ are selected so that, as described above, the cumulative axially-directed secondary spring force Fsa applied by the secondary springs 60*a*, 60*b* complements the changing primary force Fp applied to the string 30 by the primary spring 40 so as to maintain tension in the wire Tw at or sufficiently near the preferred tension Tp.

In the illustrated embodiment, the angle Φ of the deflection surface 300 is about 45°. This helps in visualization of the structure. It is anticipated that the angle @ used can be more subtle, such as in a range of 1-30° or, in other embodiments in a range of 1-20°, 1-10° or even 1-5°.

In the illustrated embodiment the spring sheets 75*a*-75*d* are substantially identical. In another embodiment the spring sheets may have different lengths. For example, spring sheet 75*b* can be marginally longer than spring sheet 75*a*, spring sheet 75*c* can be marginally longer than spring sheet 75*b*, and spring sheet 75*d* can be marginally longer than spring sheet 75*c*. Also, the deflection surface 300 can have an angle @ that is very small, or even 0°. As such, when the spring sheets 75*a*-75*d* are compressed when the carrier body 190 and base body 160 are engaged, each spring sheet 75*a*-75*d* will deflect to a different degree, as in the example described above.

The embodiments discussed above have disclosed structures with substantial specificity. This has provided a good context for disclosing and discussing inventive subject matter. However, it is to be understood that other embodiments may employ different specific structural shapes and interactions. For example, other types of secondary springs (such as coil springs, torsion springs, gas springs, etc.) can be employed, and secondary springs can be provided only at one or the other of the distal and proximal ends instead of being provided at both ends as in the illustrated embodiments. Further, although the illustrated bearings were cylindrical, other embodiments can employ, for example, spherical bearings along with different support arm structures to accommodate such spherical bearings. And embodiments in which friction is less important can employ other structures to facilitate relative movement of the carrier and base.

Indeed, several different specific structures can employ aspects and principles discussed in this specification.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments and variations described above.

What is claimed is:

1. A string tensioner for a stringed musical instrument, comprising:
- an elongated base extending from a base proximal end to a base distal end, the base comprising a base primary spring mount;
- an elongated carrier extending from a carrier proximal end to a carrier distal end, the carrier comprising a string holder and a carrier primary spring mount;
- a primary spring extending from the base primary spring mount to the carrier primary spring mount, the primary spring configured to exert a primary spring tension in an axial direction along a longitudinal axis of the string tensioner; and
- a distal secondary spring extending from the base distal end to the carrier distal end, the secondary spring configured to apply a distal secondary spring force in a direction transverse to the longitudinal axis.

2. The string tensioner of claim 1, wherein the carrier is constrained to move only in the axial direction relative to the base.

3. The string tensioner of claim 2, wherein the distal secondary spring comprises a spring sheet that is compressed along a spring sheet axis.

4. The string tensioner of claim 3, wherein the distal secondary spring comprises a plurality of spring sheets.

5. The string tensioner of claim 4, wherein the plurality of spring sheets are sandwiched between spacers at opposing mount ends of the distal secondary spring.

6. The string tensioner of claim 3, wherein the distal secondary spring comprises opposing first and second mount ends and spaced apart mount holes at each of the opposing first and second mount ends, the base distal end comprises a pair of space apart receiver holes, and the carrier distal end comprises a pair of spaced apart receiver holes, and wherein a fastener extends through each of the mount holes and receiver holes to attach the distal secondary spring to the base and carrier.

7. The string tensioner of claim 3, additionally comprising a proximal secondary spring extending from the base proximal end to the carrier proximal end, the proximal secondary spring configured to apply a proximal secondary spring force in a direction transverse to the longitudinal axis, wherein the proximal secondary spring comprises a spring sheet.

8. The string tensioner of claim 2, wherein a carrier body is spaced from a base body, wherein the base has a base support arm defining a base support arm track and the carrier has a carrier support arm defining a carrier support arm track, and wherein the base support arm track is closer to the carrier body than is the carrier support arm track, and wherein a bearing is disposed between the base support arm and the carrier support arm so as to simultaneously engage the base support arm track and the carrier support arm track.

9. The string tensioner of claim 8, wherein the distal secondary spring urges the carrier away from the base in a direction transverse to the axis, and wherein when the bearing is simultaneously engaged with the base support arm track and the carrier support arm track the carrier is blocked by the bearing from moving away from the base in the direction transverse to the axis.

10. The string tensioner of claim 1, wherein the carrier comprises a first stop and the base comprises a second stop, the first and second stops configured to block distal movement of the carrier relative to the base beyond a stop location when the first stop is engaged with the second stop, and wherein the first stop has a first stop surface that is arcuate about a first axis of rotation transverse to the longitudinal axis, and the second stop has a second stop surface that is arcuate about a second axis of rotation transverse to the longitudinal axis and transverse to the first axis of rotation.

11. The string tensioner of claim 1, wherein the carrier comprises a first stop and the base comprises a second stop, the first and second stops configured to block distal movement of the carrier relative to the base beyond a stop location when the first stop is engaged with the second stop, and wherein the first stop is formed of a material different than the second stop.

12. The string tensioner of claim 1, wherein one of the base primary spring mount and carrier primary spring mount is configured to be adjustable relative to the primary spring so as to vary the effective length of the primary spring.

13. A string tensioner for a stringed musical instrument, comprising:
- an elongated base extending from a base proximal end to a base distal end, the base comprising a base primary spring mount;
- an elongated carrier extending from a carrier proximal end to a carrier distal end, the carrier comprising a string holder and a carrier primary spring mount, the base and carrier configured so that the carrier can move longitudinally relative to the base along a longitudinal axis;
- a primary spring assembly extending from the base primary spring mount to the carrier primary spring mount, the primary spring configured to exert a primary spring tension in an axial direction along the longitudinal axis; and
- a secondary spring assembly extending between the base and the carrier and configured to apply a secondary spring force between the base and the carrier in a manner so that an axially-directed portion of the secondary spring force varies as the carrier moves longitudinally relative to the base.

14. The string tensioner of claim 13, additionally comprising a string attached to the string holder so that the tensioner applies a tension to the string, wherein the primary spring assembly and the secondary spring assembly are configured so that when the carrier moves longitudinally a first distance relative to the base, the primary spring tension changes a first primary magnitude and the axially-directed portion of the secondary spring force changes a first secondary magnitude, and wherein the change in the tension applied to the string is less than the first primary magnitude.

15. The string tensioner of claim 13, wherein a normally-directed portion of the secondary spring force urges the carrier away from the base, and a constrainment structure constrains the carrier from moving normally away from the base beyond an operational spacing.

16. The string tensioner of claim 15, wherein the constrainment structure comprises one or more bearings placed between the carrier and the base.

17. The string tensioner of claim 13, wherein the secondary spring assembly comprises a first secondary spring subassembly positioned proximal of the base primary spring mount and a second secondary spring subassembly longitudinally spaced from the first secondary spring subassembly.

18. The string tensioner of claim 17, wherein the first secondary spring subassembly comprises a plurality of spring sheets.

19. The string tensioner of claim 18, wherein when the first secondary spring subassembly is compressed, a first one of the plurality of spring sheets is deflected to a first magnitude and a second one of the plurality of spring sheets is deflected to a second magnitude that is different than the first magnitude.

* * * * *